(12) United States Patent
Kitahara

(10) Patent No.: US 6,907,862 B2
(45) Date of Patent: Jun. 21, 2005

(54) COMBUSTION CONTROL APPARATUS FOR INTERNAL COMBUSTION ENGINE

(75) Inventor: Yasuhisa Kitahara, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/895,423

(22) Filed: Jul. 21, 2004

(65) Prior Publication Data

US 2005/0039440 A1 Feb. 24, 2005

(30) Foreign Application Priority Data

Jul. 30, 2003 (JP) ........................................ 2003-282721

(51) Int. Cl.$^7$ ................................................ F02M 7/00
(52) U.S. Cl. ........................................ 123/434; 123/299
(58) Field of Search .................................. 123/434, 672, 123/518, 519, 395, 299, 406.12

(56) References Cited

U.S. PATENT DOCUMENTS 5,158,058 A * 10/1992 Yoshida et al. ............. 123/434
5,992,372 A * 11/1999 Nakajima ................... 123/295

FOREIGN PATENT DOCUMENTS

EP        1 035 315 A2    9/2000
JP       2000-320386 A   11/2000

OTHER PUBLICATIONS

U.S. Appl. No. 10/895,424, filed Jul. 21, 2004, Kitahara.
U.S. Appl. No. 10/902,422, filed Jul. 30, 2004, Nishizawa et al.
U.S. Appl. No. 10/895,409, filed Jul. 21, 2004, Kitahara.
U.S. Appl. No. 10/895,407, filed Jul. 21, 2004, Ishibashi et al.
U.S. Appl. No. 10/895,335, filed Jul. 21, 2004, Kitahara.
U.S. Appl. No. 10/902,163, filed Jul. 30, 2004, Kitahara.
U.S. Appl. No. 10/895,408, filed Jul. 21, 2004, Kitahara.
U.S. Appl. No. 10/895,286, filed Jul. 21, 2004, Kitahara.
U.S. Appl. No. 10/902,162, filed Jul. 30, 2004, Todoroki et al.

* cited by examiner

Primary Examiner—Bibhu Mohanty
(74) Attorney, Agent, or Firm—Foley & Lardner LLP

(57) ABSTRACT

A combustion control apparatus for an internal combustion engine, including an exhaust gas purifier, and a control unit programmed to selectively implement a first combustion mode and a second combustion mode, the second combustion mode providing main combustion and preliminary combustion at or near compression top dead center prior to the main combustion, and starting the main combustion after the preliminary combustion is completed. The control unit is programmed to switch from the first combustion mode to the second combustion mode when a request to switch from the first combustion mode to the second combustion mode is made based on a condition of the exhaust gas purifier, and the engine continues to operate for a predetermined time or longer under condition enabling the second combustion mode.

23 Claims, 19 Drawing Sheets

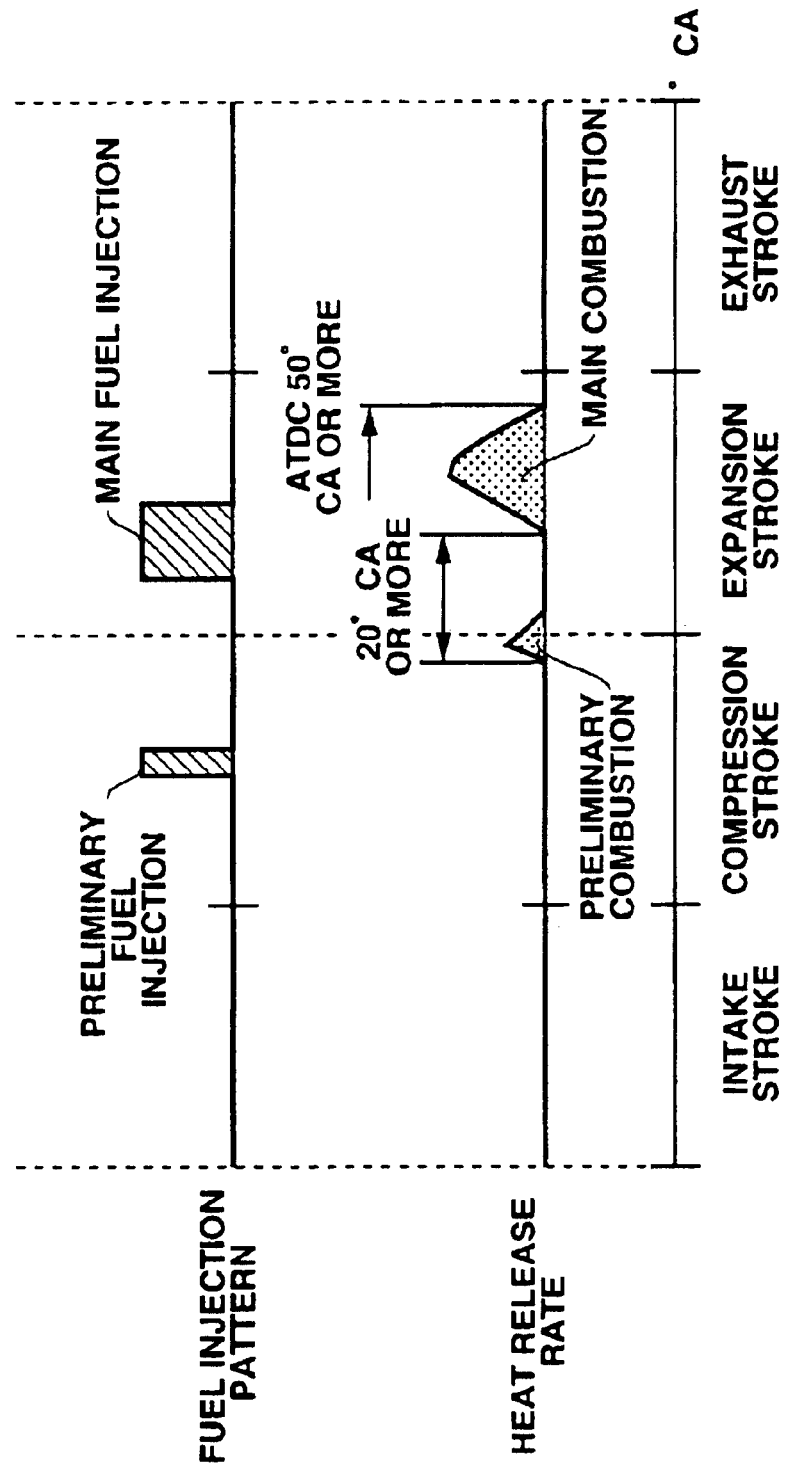

TARGET FUEL INJECTION QUANTITY
FOR PRELIMINARY COMBUSTION

TARGET FUEL INJECTION TIMING
FOR PRELIMINARY COMBUSTION

TARGET INTAKE AIR QUANTITY
FOR RICH SPIKE OPERATION

COMBUSTION CONTROL APPARATUS FOR INTERNAL COMBUSTION ENGINE

BACKGROUND OF THE INVENTION

The present invention relates to a combustion control apparatus for an internal combustion engine having an exhaust gas purifier in an exhaust gas system of the engine, and specifically, relates to an apparatus for controlling combustion in engine cylinders based on a condition of the exhaust gas purifier.

Japanese Patent Application First Publication No. 2000-320386 shows a fuel injection control system for a diesel engine with a catalyst, in which a fuel quantity determined in accordance with a torque demand of the engine is split into a plurality of parts of fuel and the split parts of fuel are sprayed in a combustion chamber of the engine at predetermined intervals at fuel injection timing near compression top dead center in order to promote a rise in temperature of the catalyst.

In the fuel injection control system as described above, upon providing the second split fuel injection and the split fuel injection thereafter, the split fuel parts are sprayed into a flame in the combustion chamber which is produced by the first or previous split fuel injection. The split fuel parts sprayed upon and after the second split fuel injection cause mainly diffusive combustion. In the case of the mainly diffusive combustion, an air-fuel ratio locally becomes too low during decreasing the air-fuel ratio to lower than a stoichiometric air-fuel ratio, namely, varying the air-fuel ratio to a rich side. This causes a large amount of smoke to be generated.

SUMMARY OF THE INVENTION

It is an object of the present invention to provide a combustion control apparatus for an internal combustion engine with an exhaust gas purifier, capable of controlling a combustion state in a combustion chamber of the engine based on a condition of the exhaust gas purifier without deteriorating smoke emission.

In one aspect of the present invention, there is provided a combustion control apparatus for an internal combustion engine having an exhaust passage, the combustion control apparatus comprising:

an exhaust gas purifier adapted to be disposed in the exhaust passage of the engine; and a control unit programmed to:
selectively implement a first combustion mode and a second combustion mode, the second combustion mode providing main combustion to produce main torque and preliminary combustion at or near top dead center of a compression stroke prior to the main combustion, and starting the main combustion after the preliminary combustion is completed;

determine whether or not a request to switch from the first combustion mode to the second combustion mode is made based on a condition of the exhaust gas purifier; and switch from the first combustion mode to the second combustion mode when the request to switch from the first combustion mode to the second combustion mode is made and the engine continues to operate for a predetermined time or longer under condition enabling the second combustion mode.

In a further aspect of the present invention, there is provided a method for controlling combustion in an internal combustion engine having an exhaust passage, an exhaust gas purifier being disposed in the exhaust passage, the method comprising:

detecting an operating condition of the engine;

detecting a condition of the exhaust gas purifier;

selectively implementing a first combustion mode and a second combustion mode, the second combustion mode which provides main combustion to produce main torque and preliminary combustion at or near top dead center of a compression stroke prior to the main combustion, and starts the main combustion after the preliminary combustion is completed;

determining whether or not a request to switch from a first combustion mode to a second combustion mode is made based on the condition of the exhaust gas purifier;

determining whether or not the engine continues to operate for a predetermined time or longer under condition enabling the second combustion mode, based on the operating condition of the engine; and switching from the first combustion mode to the second combustion mode when the request to switch from the first combustion mode to the second combustion mode is made and the engine continues to operate for the predetermined time or longer under condition enabling the second combustion mode.

BRIEF DESCRIPTION OF THE DRAWINGS

FIG. 2 is a time chart illustrating a fuel injection pattern and a combustion pattern in a split retard combustion mode, namely, a combustion mode for regeneration of an exhaust gas purifier, which is implemented in the apparatus of the embodiment.

DETAILED DESCRIPTION OF THE INVENTION

Figure 1:
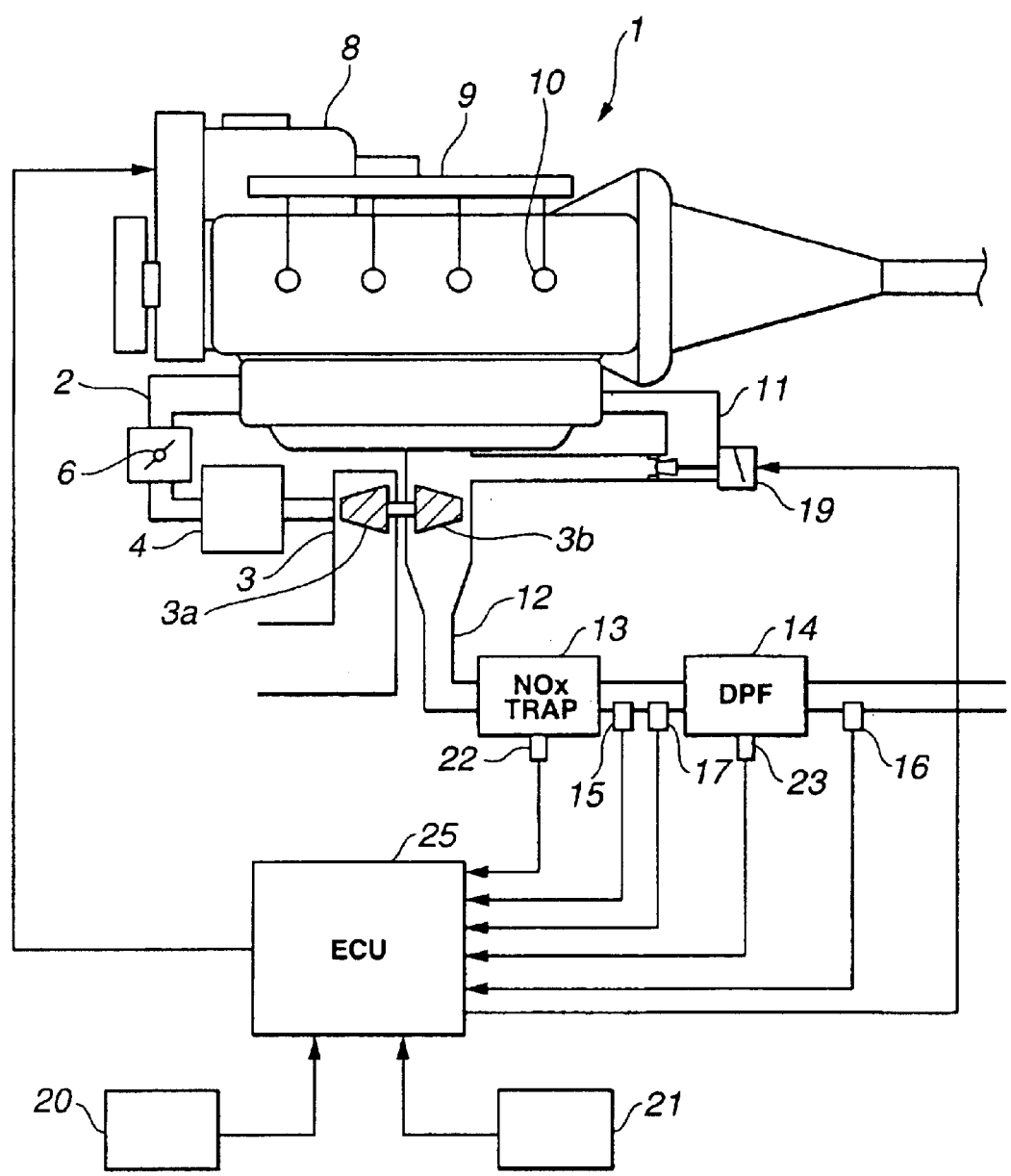
FIG. 1 is a schematic diagram illustrating a diesel engine to which a combustion control apparatus according to an embodiment of the present invention is applicable.

Referring to FIGS. 1–24, a combustion control apparatus for an internal combustion engine, according to an embodiment of the present invention, now is explained. In this embodiment, the apparatus is applied to a diesel engine, referred to hereinafter merely as an engine. As illustrated in FIG. 1, engine 1 includes intake passage 2 and compressor 3a of turbocharger 3 disposed upstream of intake passage 2. Intake air is supercharged by turbocharger 3 and then cooled by intercooler 4. The intake air passes through intake throttle valve 6 and flows into combustion chambers of respective engine cylinders. Fuel pressurized by fuel pump 8 is supplied to fuel injector 10 within each of the engine cylinders, via common rail 9. The fuel is directly sprayed from fuel injector 10 into the combustion chamber of the engine cylinder. The intake air flowing into the combustion chamber and the fuel sprayed into the combustion chamber form an air-fuel mixture. The air-fuel mixture within the combustion chamber is combusted by compression ignition. Exhaust gas produced by the combustion is discharged into exhaust gas passage 12. A part of the exhaust gas discharged is returned to intake air passage 2 via exhaust gas recirculation passage 11 in which exhaust gas recirculation control valve 19, hereinafter referred to as EGR control valve, is disposed. The remainder of the exhaust gas discharged drives turbine 3b of turbocharger 3, so that compressor 3a arranged coaxially with turbine 3b supercharges the intake air flowing into turbocharger 3.

Nitrogen oxides trap 13, hereinafter referred to as NOx trap, is disposed downstream of turbine 3b within exhaust gas passage 12. Diesel particulate filter 14, hereinafter referred to as DPF, is disposed downstream of NOx trap 13. NOx trap 13 is constructed to trap nitrogen oxides (NOx) contained in the exhaust gas when an exhaust gas air-fuel ratio is lean wherein the exhaust gas has excessive oxygen concentration, and constructed to release and purify the NOx trapped when the exhaust gas air-fuel ratio is rich wherein the exhaust gas has excessive fuel quantity. In other words, NOx trap 13 is constructed to trap NOx contained in the exhaust gas when the exhaust gas air-fuel ratio is higher than a stoichiometric air-fuel ratio, and constructed to release and purify the NOx trapped when the exhaust gas air-fuel ratio is lower than the stoichiometric air-fuel ratio. NOx trap 13 carries an oxidation catalyst, for instance, noble metals such as Pt, and therefore, has a function of oxidizing exhaust gas contents such as HC and CO flowing into NOx trap 13. DPF 14 is constructed to collect PM contained in the exhaust gas. DPF 14 also carries an oxidation catalyst, for instance, noble metals, and thus has a function of oxidizing exhaust gas contents such as HC and CO flowing into DPF 14. NOx trap 13 may be arranged downstream of DPF 14 in exhaust gas passage 12. Further, NOx trap 13 and DPF 14 may be constructed as an integral unit.

Various sensors are electronically coupled to engine control unit 25, hereinafter referred to as ECU. ECU 25 receives the signals generated from the sensors and processes the signals to determine operating conditions of engine 1. Depending on the engine operating conditions, ECU 25 performs various controls as explained later. ECU 25 includes one or more microcomputers each including a central processing unit (CPU), a read-only memory (ROM), a random access memory (RAM), and input/output interface (I/O interface).

The various sensors include engine speed sensor or crank angle sensor 20, accelerator sensor 21, NOx trap temperature sensor 22, exhaust gas temperature sensor 15, exhaust gas pressure sensor 17, DPF temperature sensor 23 and exhaust gas air-fuel ratio sensor 16. Engine speed sensor 20 detects an engine speed and generates signal Ne indicative of the detected engine speed. Accelerator sensor 21 detects an opening degree of an accelerator and generates signal APO indicative of the detected accelerator opening degree. NOx trap temperature sensor 22 detects a bed temperature of NOx trap 13 and generates a signal indicative of the detected bed temperature of NOx trap 13. DPF temperature sensor 23 detects a bed temperature of DPF 14 and generates a signal indicative of the detected bed temperature of DPF 14. Exhaust gas temperature sensor 15 detects an exhaust gas temperature on the side of an outlet of NOx trap 13 and generates a signal indicative of the detected exhaust gas temperature. Exhaust gas pressure sensor 17 detects an exhaust gas pressure on the side of an inlet of DPF 14 and generates a signal indicative of the detected exhaust gas pressure. Exhaust gas air-fuel ratio sensor 16 detects an exhaust gas air-fuel ratio on the side of an outlet of DPF 14 and generates signal λ indicative of the detected exhaust gas air-fuel ratio.

The bed temperature of NOx trap 13 can be estimated based on the exhaust gas temperature detected by exhaust gas temperature sensor 15. Further, an exhaust gas temperature sensor may be disposed on a downstream side of DPF 14. The bed temperature of DPF 14 can be estimated based on the exhaust gas temperature detected by the exhaust gas temperature sensor disposed on the downstream side of DPF 14.

ECU 25 develops and transmits a fuel injection control signal to fuel injector 10 for controlling the fuel injection quantity and the fuel injection timing, an intake throttle control signal to intake throttle valve 6 for controlling the opening degree, and an EGR control signal to EGR control valve 19 for controlling the opening degree.

ECU 25 implements regeneration control of exhaust gas purifier, namely, NOx trap 13 and DPF 14. The regeneration control includes control of oxidizing PM quantity accumulated in DPF 14 at high temperature and in lean atmosphere, control of releasing and reducing NOx trapped by NOx trap 13 in rich atmosphere, and control of recovering sulfur poisoning of NOx trap 13 at high temperature and in rich atmosphere.

ECU 25 is programmed to selectively operate engine 1 in a normal combustion mode and a split retard combustion mode based on the engine operating condition. Specifically, ECU 25 operates engine 1 in the normal combustion mode in the lean operating condition. In the normal combustion mode, a preliminary fuel injection is provided prior to a main fuel injection in order to prevent abrupt combustion at an initial stage. A fuel injection timing for the preliminary fuel injection is set in a range of 40° to 10° of crank angle (CA) before top dead center (BTDC). A fuel injection quantity for the preliminary fuel injection is set in a range of 1 to 3 mm³ per stroke. A fuel injection timing for the main fuel injection is set in a range of about 10° to about –20° CA BTDC. An interval between the preliminary fuel injection and the main fuel injection is set in a range of about 10° to about 30° CA. On the other hand, ECU 25 switches from the normal combustion mode to the split retard combustion mode upon implementing the regeneration of DPF 14 and NOx trap 13 in which a rich air-fuel ratio of the exhaust gas and a high temperature thereof are required.

If an intake air quantity is reduced in order to vary the exhaust gas air-fuel ratio to the rich side upon the preliminary fuel injection in the normal combustion mode, an incylinder compression end temperature will decrease. Here, the incylinder compression end temperature means incylinder atmospheric temperature at or near top dead center (TDC) of the compression stroke. In this case, even when the main fuel injection timing is varied toward delay for the purposes of raising the exhaust gas temperature and adjusting the exhaust gas air-fuel ratio to the rich side, the main fuel injection timing cannot be retarded as required. For example, an engine operating condition required to recover sulfur poisoning of NOx trap 13, namely, an engine operating condition in which an excess air ratio is 1 or less and an exhaust gas temperature is 600° C. or more, cannot be realized.

For the reason described above, when the regeneration of DPF 14 and NOx trap 13 is required, the engine operation is switched from the normal combustion mode to the split retard combustion mode in which the engine operation at the rich exhaust gas air-fuel ratio and/or at the high exhaust gas temperature is performed. In the split retard combustion mode, fuel injection is controlled so as to provide preliminary combustion at or near TDC of the compression stroke prior to main combustion producing main torque, and start the main combustion after the preliminary combustion is completed.

FIG. 2 illustrates fuel injection pattern and heat release rate which are provided in the split retard combustion mode. As shown in FIG. 2, preliminary fuel injection is provided at the compression stroke to thereby produce the preliminary combustion at or near compression TDC in order to raise an incylinder temperature. A preliminary fuel injection quantity to be provided for producing the preliminary combustion at the compression stroke is a fuel injection quantity required to increase the incylinder temperature to a temperature higher than a self ignition temperature, upon the main fuel injection. The self ignition temperature means a temperature at which an air-fuel mixture in the combustion chamber is spontaneously ignitable. Owing to the incylinder temperature rise caused by the preliminary combustion, retardation or delay of the main combustion can be promoted.

Figure 5:
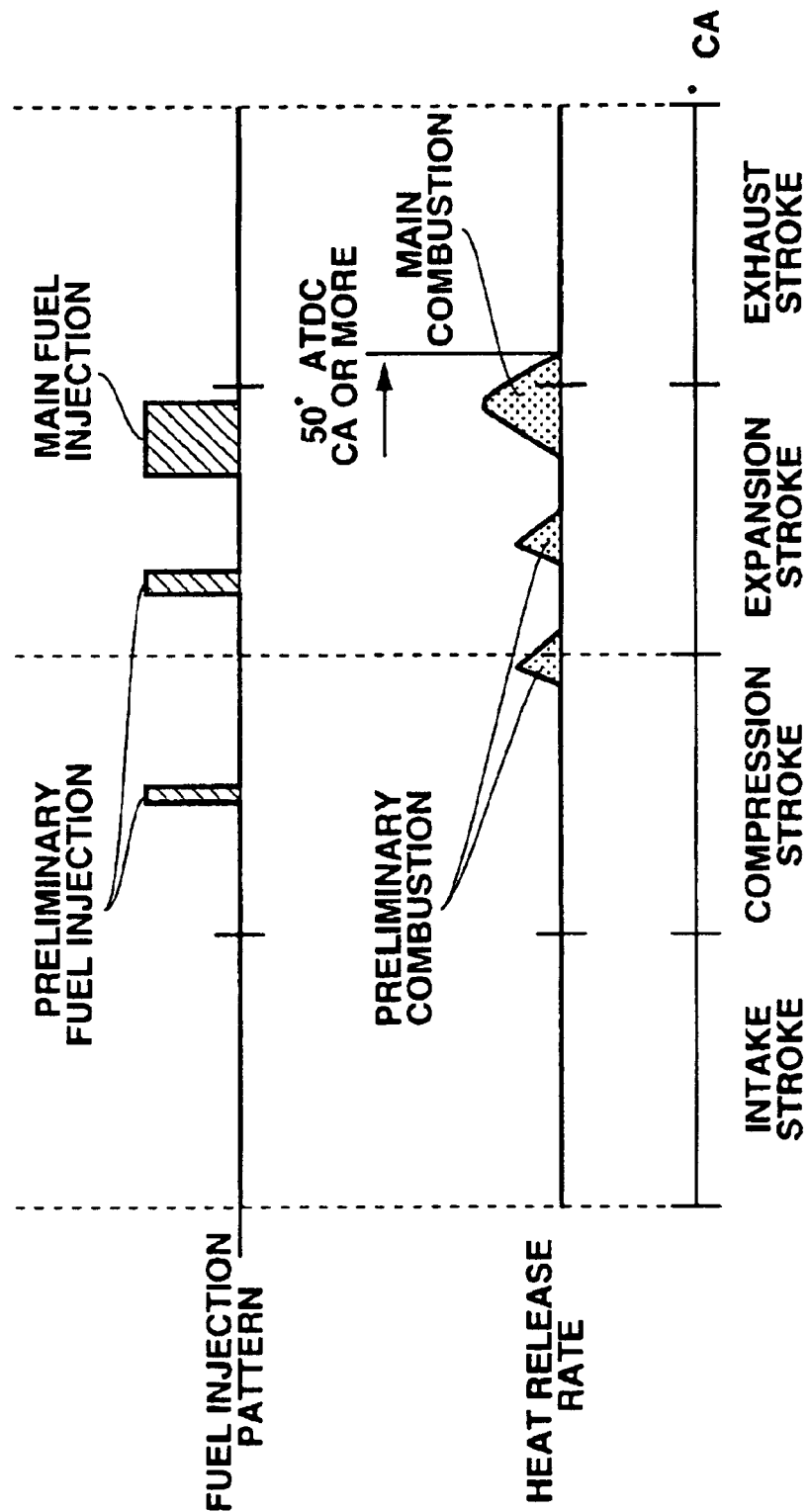
FIG. 5 is a time chart illustrating a modification of the split retard combustion mode, which is different from FIG. 2 in the fuel injection pattern and the combustion pattern.

FIG. 5 illustrates a modification of the split retard combustion mode. In this modification, ECU 25 is programmed to provide the preliminary combustion a plurality of times at one cycle of the engine operation in the split retard combustion mode. In this case, the preliminary fuel injection is provided to produce the preliminary combustion at or near compression TDC at least once. Further, ECU 25 can be programmed to vary the preliminary fuel injection quantity and/or the preliminary fuel injection timing for the preliminary combustion based on the incylinder compression end temperature in the split retard combustion mode. The incylinder compression end temperature can be estimated from an operating condition of engine 1 including engine speed Ne, fuel injection quantity Qf.

Further, ECU 25 is programmed to provide main fuel injection after compression dead center (ATDC) so as to start the main combustion after the preliminary combustion is completed, in the split retard combustion mode. Specifically, the fuel injection timing of the main fuel injection is controlled so as to retard a main combustion start timing of the main combustion from a preliminary combustion start timing of the preliminary combustion by not less than 20° in terms of crank angle. As a result, a ratio of premixed combustion to the main combustion is increased to thereby suppress emission of smoke. Furthermore, the fuel injection timing of the main fuel injection is controlled so as to set a main combustion end timing of the main combustion to be equal to or greater than 50° in terms of crank angle after compression top dead center (ATDC).

In the split retard combustion mode where the preliminary combustion and the main combustion are produced, the preliminary combustion allows the retard limit of the main combustion to be broadened. This improves control of an exhaust gas temperature to a target temperature. Further, in the split retard combustion mode, the main fuel injection is provided after the preliminary combustion is finished, and then the main combustion is started. This causes increase in the ratio of premixed combustion to the main combustion, to thereby restrain increase in smoke emission which is caused during an engine operation at a rich air-fuel ratio.

Figure 3A:
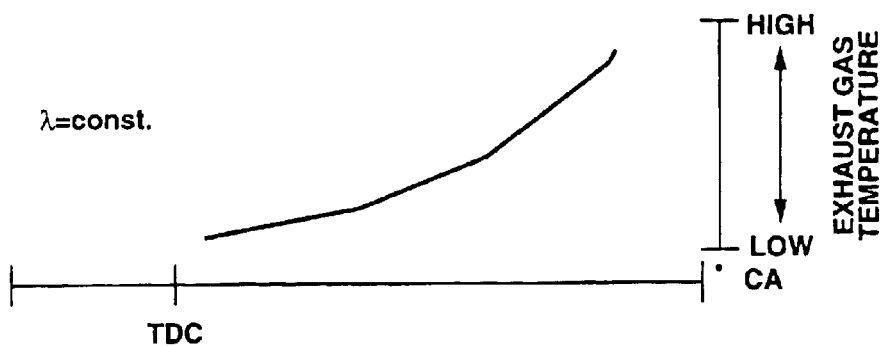
FIGS. 3A–3D are diagrams illustrating exhaust gas condition during main combustion of the split retard combustion mode in the apparatus of the embodiment.
Figure 3B:
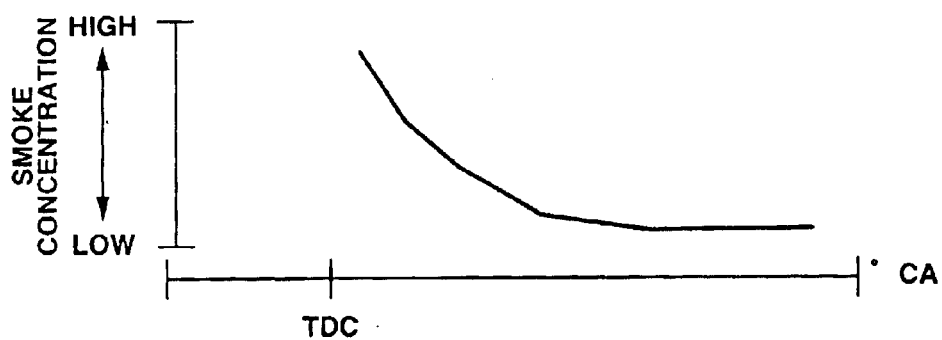
Figure 3C:
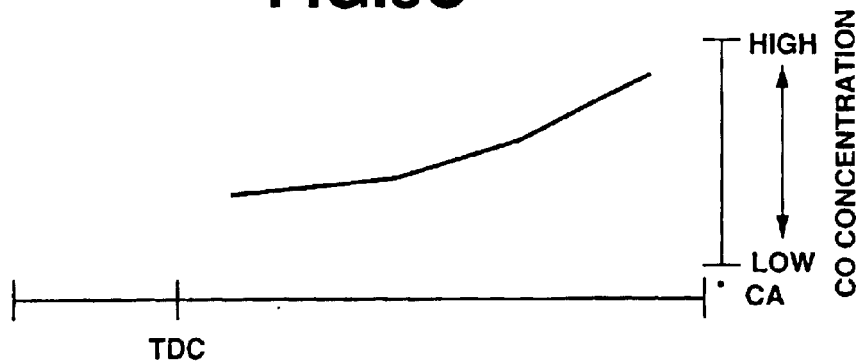
Figure 3D:
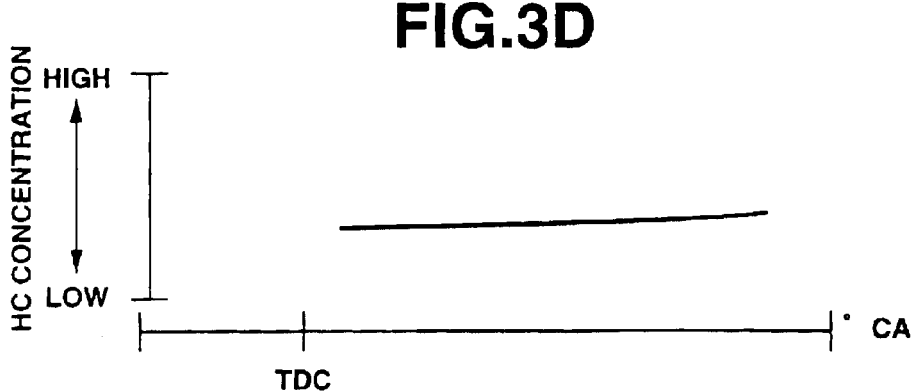

FIGS. 3A–3D illustrate an exhaust gas condition during the main combustion period in the split retard combustion mode. FIG. 3A shows exhaust gas temperature. FIG. 3B shows smoke concentration. FIG. 3C shows carbon monoxide (CO) concentration. FIG. 3D shows hydrocarbon (HC) concentration. As illustrated in FIGS. 3A and 3B, as the main combustion period is retarded, the smoke concentration becomes lower and the exhaust gas temperature becomes higher. This is because the premixed combustion ratio increases with promotion of retardation of the main combustion period.

Figure 4:
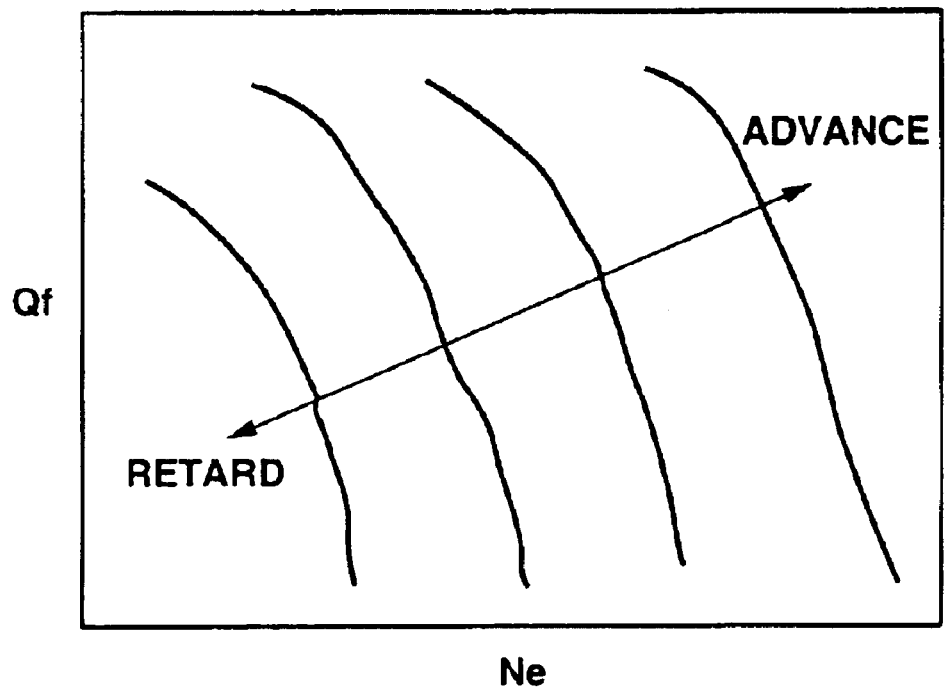
FIG. 4 is a diagram illustrating a target fuel injection timing for the main combustion of the split retard combustion mode in the apparatus of the embodiment.

FIG. 4 illustrates a target fuel injection timing for producing the main combustion. In FIG. 4, the axis of abscissa represents engine speed Ne, and the axis of ordinate represents fuel injection quantity Qf. As seen from FIG. 4, it is required to greatly retard the main combustion in order to reach a target exhaust gas temperature during the engine operation in a low-speed and low-load range. In the low-speed and low-load range, the incylinder temperature cannot be always held high by producing the preliminary combustion only one time. In such a case, as shown in FIG. 5, the preliminary fuel injection is provided a plurality of times so as to produce the preliminary combustion a plurality of times and cause heat release without overlapping one another. As a result, even in the low-speed and low-load engine operating range, the main combustion can be retarded to such a limit as to achieve the target exhaust gas temperature.

Figure 6:
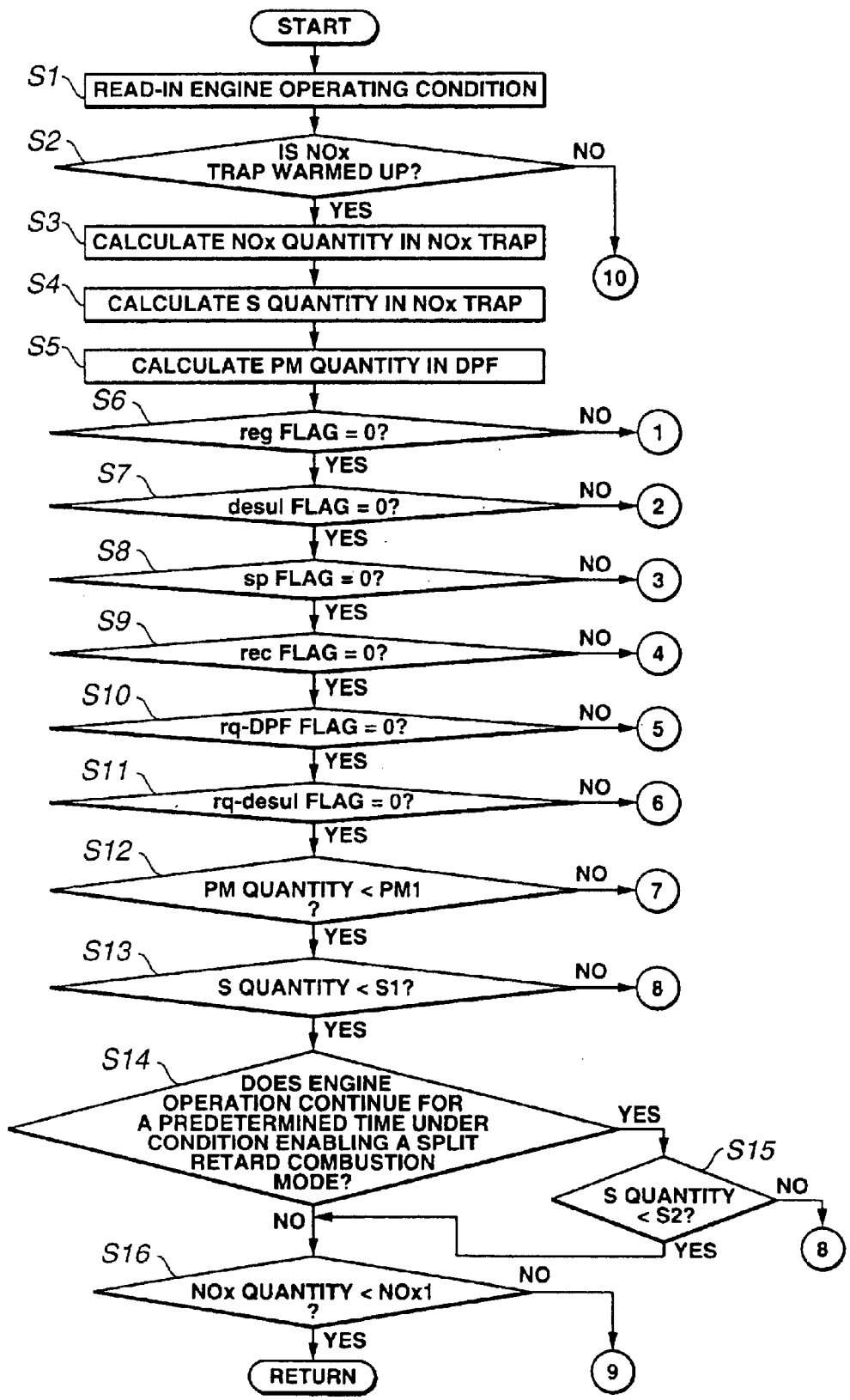
FIG. 6 is a flowchart of a main routine executed for controlling regeneration of the exhaust gas purifier in the apparatus of the embodiment.

Referring to FIG. 6, a flow of a main routine for controlling regeneration of the exhaust gas purifier, which is implemented by ECU 25, is explained. Logic flow starts and goes to block S1 where engine operating conditions are read in. The engine operating conditions include engine speed Ne, accelerator opening degree APO, bed temperature of NOx trap 13, bed temperature of DPF 14 and exhaust gas pressure on the inlet and outlet sides of DPF 14. In addition, at block S1, fuel injection quantity Qf is read in by searching a map showing fuel injection quantity Qf calculated based on engine speed Ne and accelerator opening degree APO as parameters. The logic then goes to block S2 where a determination is made as to whether or not NOx trap 13 is warmed up, namely, activated. Specifically, this determination is made as to whether or not exhaust gas temperature T calculated based on the output signal from exhaust gas temperature sensor 15 is higher than predetermined temperature T5 at which NOx trap 13 starts to be activated. If the answer to block S2 is YES, it is determined that NOx trap 13 is activated, and the logic goes to block S3. If the answer to block S2 is NO, it is determined that NOx trap 13 is in inactive state, and the logic goes to subroutine 10 for controlling promotion of activation of NOx trap 13. A flow of subroutine 10 will be explained later by referring to FIG. 16.

At block S3, a NOx quantity trapped by NOx trap 13 is calculated. The NOx quantity can be estimated from a cumulative value of engine speed Ne, or a cumulative value of a mileage of the vehicle. The NOx quantity estimation result is reset at the time when release and reduction of the NOx quantity is completed. The release and reduction of the NOx quantity may be implemented by executing sulfur poisoning recovery of NOx trap 13. In such a case, the reset of the NOx quantity estimation result is also executed.

At block S4, a quantity of sulfur content such as SOx, hereinafter referred to as S quantity, which is trapped by NOx trap 13 is calculated. Similar to the NOx quantity, the S quantity can be estimated from a cumulative value of engine speed Ne, or a cumulative value of a mileage of the vehicle. The S quantity estimation result is reset at the time when the sulfur poisoning recovery of NOx trap 13 is completed.

At block S5, a PM quantity accumulated in DPF 14 is calculated. The PM quantity can be estimated by comparing the exhaust gas pressure detected by exhaust gas pressure sensor 17 on the inlet side of DPF 14, with a reference exhaust gas pressure determined based on the current engine operating condition, namely, engine speed Ne and fuel injection quantity Qf. The PM quantity can be estimated from a cumulative value of engine speed Ne or a cumulative value of a mileage of the vehicle from the previous execution of regeneration of DPF 14. Further, the PM quantity can be estimated from combination of the exhaust gas pressure detected by exhaust gas pressure sensor 17, with the cumulative value of engine speed Ne or the cumulative value of the mileage.

At block S6, a determination is made as to whether or not reg flag is set to 0, that is, reg flag=0. If the answer to block S6 is YES, it is determined that a DPF regeneration mode for regenerating DPF 14 is not operated, and the logic goes to block S7. In the DPF regeneration mode, oxidation of the PM quantity accumulated in DPF 14 is executed. If the answer to block S6 is NO, indicating that reg flag=1, it is determined that the DPF regeneration mode is operated, and the logic goes to subroutine 1 for implementing the DPF regeneration operation. A flow of subroutine 1 will be explained later by referring to FIG. 7.

At block S7, a determination is made as to whether or not desul flag is set to 0, that is, desul flag=0. If the answer to block S7 is YES, it is determined that a NOx trap sulfur poisoning recovery mode for recovering sulfur poisoning of NOx trap 13 is not operated, and the logic goes to block S8. If the answer to block S7 is NO, indicating that desul flag=1, it is determined that the sulfur poisoning recovery mode is operated, and the logic goes to subroutine 2 for implementing the NOx trap sulfur poisoning recovery operation. A flow of subroutine 2 will be explained later by referring to FIG. 8.

At block S8, a determination is made as to whether or not sp flag is set to 0, that is, sp flag=0. If the answer to block S8 is YES, it is determined that a rich spike mode in which the exhaust gas air-fuel ratio is temporarily varied to the rich side lower than a stoichiometric air/fuel ratio in order to release and reduce the NOx quantity trapped by NOx trap 13, is not operated. Then, the logic goes to block S9. If the answer to block S8 is NO, indicating that sp flag=1, it is determined that the rich spike mode is operated, and the logic goes to subroutine 3 for implementing the rich spike operation. A flow of subroutine 3 will be explained later by referring to FIG. 9.

At block S9, a determination is made as to whether or not rec flag is set to 0, that is, rec flag=0. If the answer to block S9 is YES, it is determined that a DPF melting preventing mode for preventing DPF 14 from melting is not operated after the DPF regeneration mode or the NOx trap sulfur poisoning recovery mode is operated. Then, the logic goes to block S10. If the answer to block S9 is NO, indicating that rec flag=1, it is determined that the DPF melting preventing mode is operated, and the logic goes to subroutine 4 for implementing the DPF melting preventing operation. A flow of subroutine 4 will be explained later by referring to FIG. 10.

At block S10, a determination is made as to whether or not rq-DPF flag is set to 0, that is, rq-DPF flag=0. If the answer to block S10 is YES, it is determined that a request to regenerate DPF 14 is not made, and the logic goes to block S11. If the answer to block S10 is NO, indicating that rq-DPF flag=1, it is determined that the request to regenerate DPF 14 is made. Then, the logic goes to subroutine 5 for making transition to the DPF regeneration mode in order of precedence. A flow of subroutine 5 will be explained later by referring to FIG. 11.

At block S11, a determination is made as to whether or not rq-desul flag is set to 0, that is, rq-desul flag=0. If the answer to block S11 is YES, it is determined that a request to recover sulfur poisoning of NOx trap 13 is not made, and the logic goes to block S12. If the answer to block S11 is NO, indicating that rq-desul flag=1, it is determined that the request to recover the sulfur poisoning of NOx trap 13 is made. Then, the logic goes to subroutine 6 for making transition to the sulfur poisoning recovery mode in order of precedence. A flow of subroutine 6 will be explained later by referring to FIG. 12.

Figure 13:
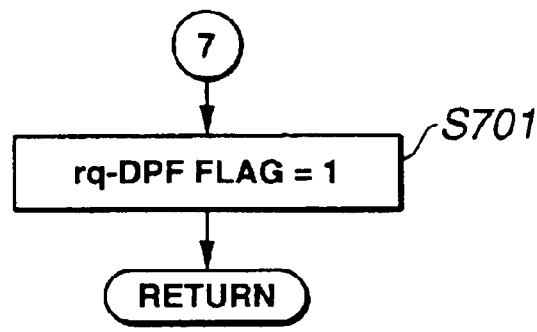
FIG. 13 is a flowchart of a routine executed for making a request to regenerate the DPF in the apparatus of the embodiment.

At block S12, a determination is made as to whether or not the PM quantity calculated at block S5 is smaller than preset value PM1. When the PM quantity reaches preset value PM1, DPF 14 needs to be regenerated. In other words, at block S12, a determination is made as to whether or not timing of regeneration of DPF 14 is reached. If the answer to block S12 is YES, it is determined that the timing of regeneration of DPF 14 is not reached, and the logic goes to block S13. If the answer to block S12 is NO, it is determined that the PM quantity is equal to or larger than preset value PM1, and that the timing of regeneration of DPF 14 is reached. Then, the logic goes to subroutine 7 shown in FIG. 13. In FIG. 13, at block S701, rq-DPF flag is set to 1 to make a request to regenerate DPF 14.

Figure 14:
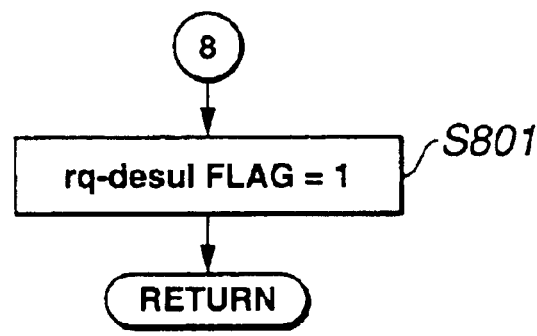
FIG. 14 is a flowchart of a routine executed for making the request to recover sulfur poisoning of the NOx trap in the apparatus of the embodiment.

At block S13, a determination is made as to whether or not the S quantity calculated at block S4 is smaller than preset value S1. Preset value S represents a level for requesting to recover or remove sulfur poisoning of NOx trap 13. When the S quantity reaches preset value S1, it is required to recover or remove sulfur poisoning of NOx trap 13 and thereby regenerate NOx trap 13. If the answer to block S13 is YES, it is determined that the recovery of sulfur poisoning of NOx trap 13 is not required, and the logic goes to block S14. If the answer to block S13 is NO, it is determined that the S quantity is equal to or larger than preset value S1 and that the recovery of sulfur poisoning of NOx trap 13 is required. Then, the logic goes to subroutine 8 shown in FIG. 14. In FIG. 14, at block S801, rq-desul flag is set to 1 to make a request to implement the recovery of sulfur poisoning of NOx trap 13.

Figure 18:
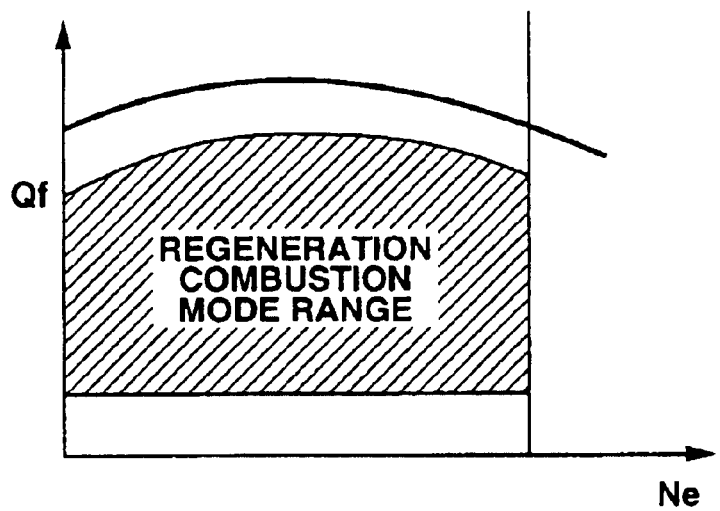
FIG. 18 is a map illustrating a range enabling the split retard combustion mode in the apparatus of the embodiment.
Figure 19:
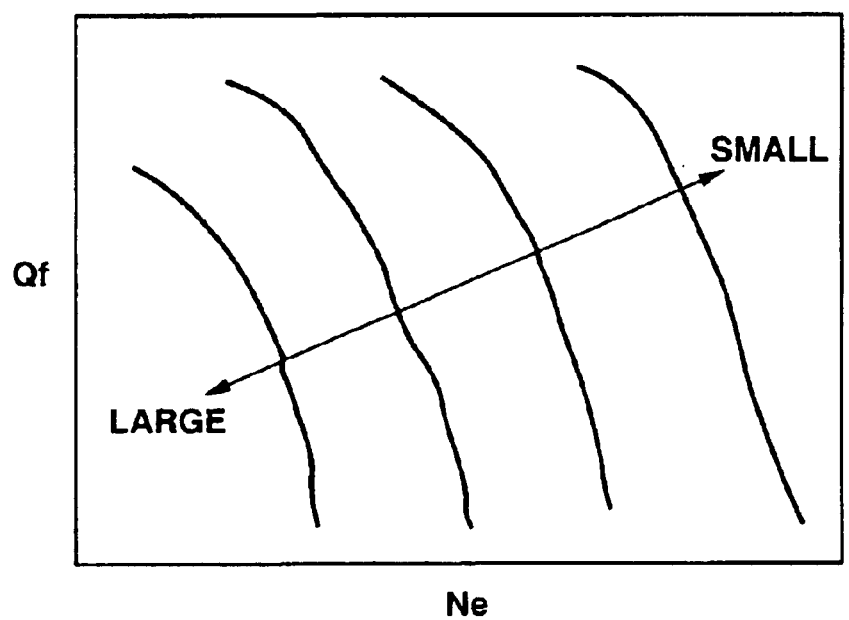
FIG. 19 is a map illustrating a characteristic of a target fuel injection quantity for a preliminary combustion in the split retard combustion mode in the apparatus of the embodiment.
Figure 20:
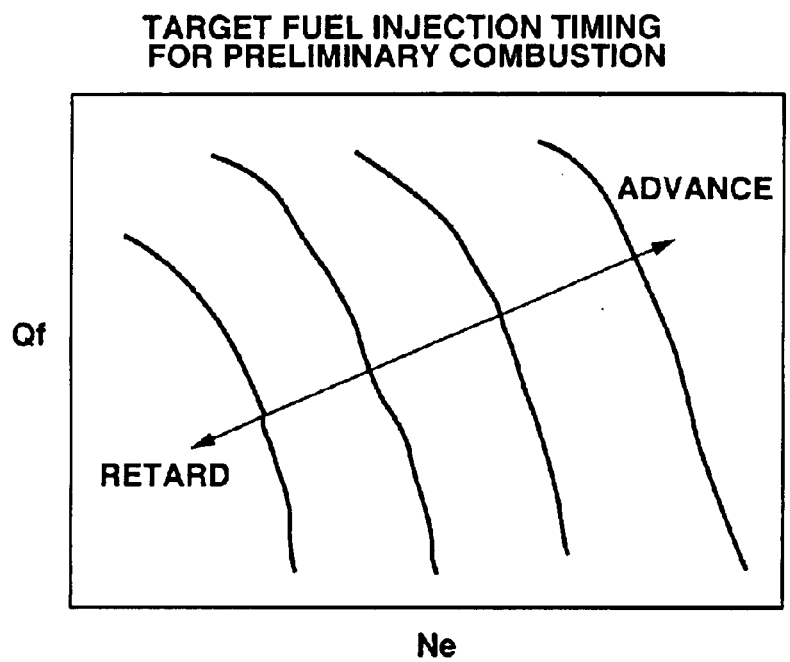
FIG. 20 is a map illustrating a characteristic of a target fuel injection timing for the preliminary combustion in the split retard combustion mode in the apparatus of the embodiment.

At block S14, a determination is made as to whether or not an engine operation continues for a predetermined time or longer under condition enabling a rich operation in the split retard combustion mode. In other words, a determination is made as to whether or not a duration of an engine operation under condition that a rich operation in the split retard combustion mode is allowable, reaches a predetermined time or longer. In this embodiment, the predetermined time is about 3 to 5 minutes. When the engine is operated in the split retard combustion mode within a high speed range in which the engine speed is more than a predetermined speed, the exhaust gas temperature increases too much. In addition, when the engine is operated in the split retard combustion mode within a high load range in which the engine load exceeds an upper limit, smoke emission caused by the rich operation cannot be sufficiently suppressed. Further, when the engine is operated in the split retard combustion mode within a low load range in which the engine load is below a lower limit, it is difficult to realize stable combustion. Accordingly, the condition enabling the rich operation in the split retard combustion mode without causing the above-discussed problems is met in a low and middle speed and middle load range in which the engine speed is equal to or lower than the predetermined speed and the engine load is between the upper and lower limits. FIG. 18 illustrates the low and middle speed and middle load range, hereinafter referred to as a regeneration combustion mode range. In the regeneration combustion mode range, the smoke emission can be suppressed, and the air-fuel ratio can be controlled to the rich side for recovering sulfur poisoning of NOx trap 13.

If the answer to block S14 is YES, it is determined that the engine operation continues for the predetermined time or longer under the condition enabling the rich operation in the split retard combustion mode. In such a case, the recovery of sulfur poisoning of NOx trap 13 can be attained without deviating from the regeneration combustion mode range. For instance, the operating condition will be met by a vehicle traveling at a speed of 80 to 120 km/h on a highway. The logic then goes to block S15.

At block S15, a determination is made as to whether or not the S quantity calculated at block S4 is smaller than preset value S2. Preset value S2 is smaller than preset value S1 used at block S13, and represents a value for allowing the recovery of sulfur poisoning of NOx trap 13 even when the S quantity is below preset value S1. If the answer to block S15 is NO, it is determined that the S quantity is equal to or larger than preset value S2 and smaller than preset value S1 and that the recovery of sulfur poisoning of NOx trap 13 is required. Then, the logic goes to subroutine 8, similar to the case where it is determined at block S13 that the S quantity is equal to or larger than preset value S1.

Specifically, when the S quantity reaches preset value S1, the request to recover or remove sulfur poisoning of NOx trap 13 is made. Further, in a case where the engine operation continues for the predetermined time or longer in the regeneration combustion mode range and the S quantity is between preset value S1 and preset value S2, it is determined that a request to switch from the normal combustion mode to the split retard combustion mode is satisfied. In this case, the recovery of sulfur poisoning of NOx trap 13 is positively implemented. As a result, the recovery of sulfur poisoning of NOx trap 13 can be executed under optimal condition that smoke emission can be suppressed and the recovery of NOx trap 13 can be achieved.

If the answer to block S14 is NO, it is determined that the engine operation does not continue for the predetermined time or longer under the condition enabling the rich operation in the split retard combustion mode. The logic goes to block S16. If the answer to block S15 is YES, it is determined that the S quantity is smaller than preset value S2, and the logic goes to block S16.

Figure 15:
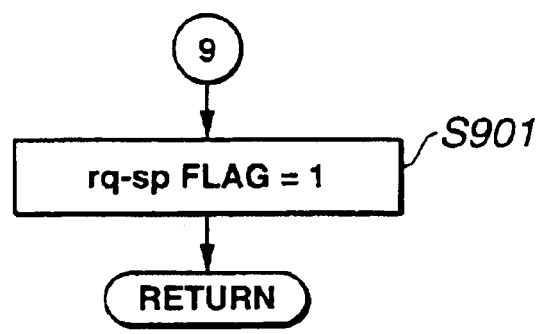
FIG. 15 is a flowchart of a routine executed for making a request to implement the rich spike operation in the apparatus of the embodiment.

At block S16, a determination is made as to whether or not the NOx quantity calculated at block S3 is smaller than preset value NOx1. In other words, at block S16, a determination is made as to whether or not timing of an operation of releasing and reducing the NOx quantity is reached. If the answer to block S16 is YES, it is determined that the NOx release and reduction operation, namely, the rich spike operation, is not required, and the logic is ended. If the answer to block S16 is NO, it is determined that the NOx quantity is equal to or larger than preset value NOx1 and that the NOx release and reduction operation is required. Then, the logic goes to subroutine 9 shown in FIG. 15. In FIG. 15, at block S901, rq-sp flag is set to 1 to make a request to implement the rich spike operation required for the NOx release and reduction operation.

Figure 7:
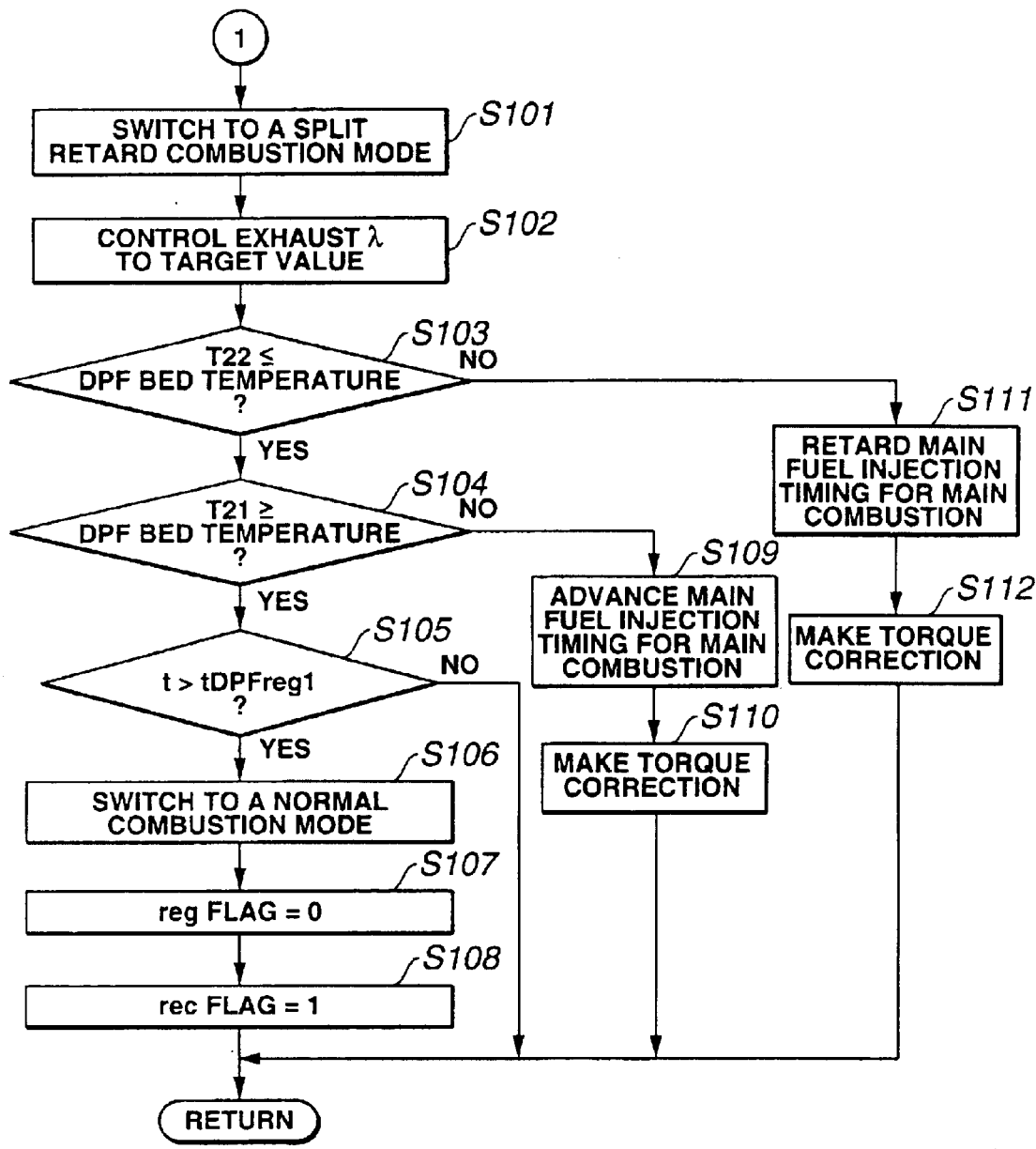
FIG. 7 is a flowchart of a routine executed for implementing regeneration of a diesel particulate filter (DPF) in the apparatus of the embodiment.
Figure 17:
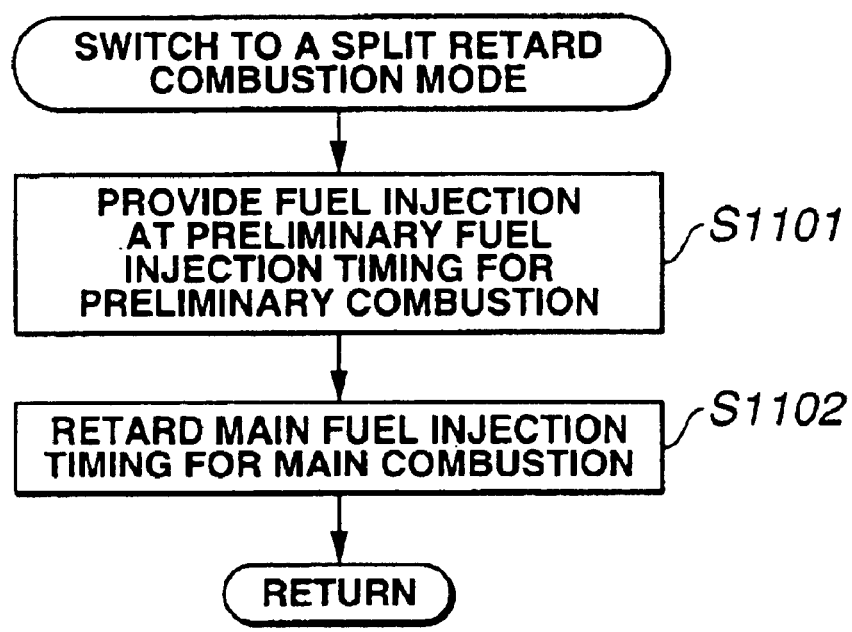
FIG. 17 is a flowchart of a routine executed for controlling switching between combustion modes in the apparatus of the embodiment.

Next, referring to FIG. 7, subroutine 1 for implementing the DPF regeneration operation when the answer to block S6 of the main routine of FIG. 6 is NO, is explained in detail. At block S101, a combustion mode is switched from the normal lean combustion mode to the split retard combustion mode. This combustion mode switching operation is executed by a flow as shown in FIG. 17. As illustrated in FIG. 17, at block S1101, the preliminary fuel injection for the preliminary combustion is provided. Specifically, a target preliminary fuel injection quantity to be provided for producing the preliminary combustion is set by searching a map of FIG. 19 based on engine speed Ne and fuel injection quantity Qf. A target preliminary fuel injection timing to be provided for producing the preliminary combustion is set by searching a map of FIG. 20 based on engine speed Ne and fuel injection quantity Qf.

Figure 21:
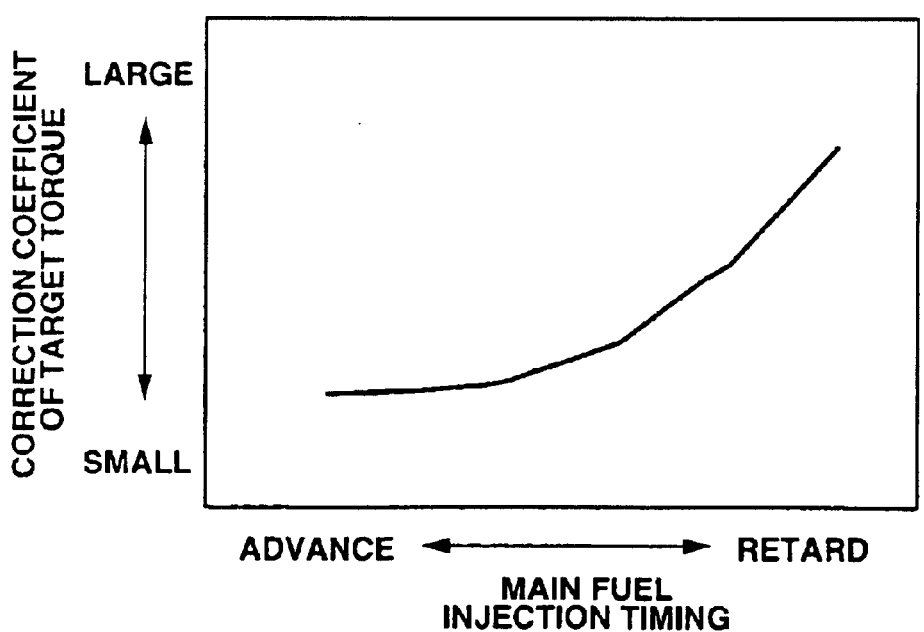
FIG. 21 is a map illustrating a relationship between fuel injection timing for the main combustion of the split retard combustion mode and correction coefficient of target torque in the apparatus of the embodiment.

At block S1102 of FIG. 17, the target main fuel injection timing for producing the main combustion is set by searching the map of FIG. 4 based on engine speed Ne and fuel injection quantity Qf, and the current main fuel injection timing is gradually retarded toward the target main fuel injection timing. Further, a retarded main fuel injection quantity to be provided at the retarded main fuel injection timing is set so as to produce an output torque equal to that obtained in the normal combustion mode, based on a correction coefficient shown in a map of FIG. 21. As illustrated in FIG. 21, as the main fuel injection timing is retarded, the correction coefficient becomes larger. The retarded main fuel injection quantity is determined by multiplying a normal main fuel injection quantity by the correction coefficient. Accordingly, as the main fuel injection timing is retarded, the retarded main fuel injection quantity is increased.

Figure 22:
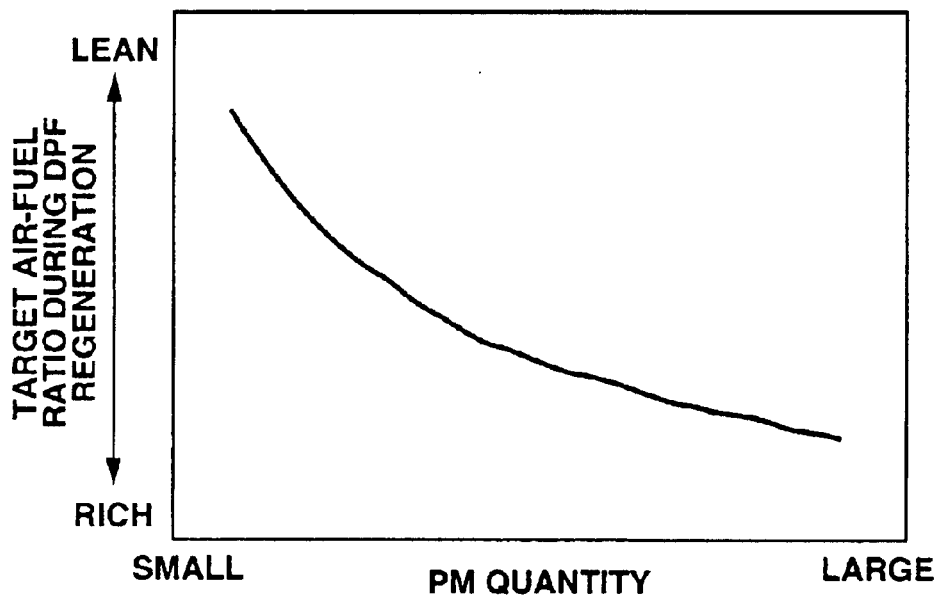
FIG. 22 is a map illustrating a relationship between quantity of particulate matter (PM) accumulated in the DPF and target air-fuel ratio during the regeneration operation of the DPF in the apparatus of the embodiment.
Figure 23:
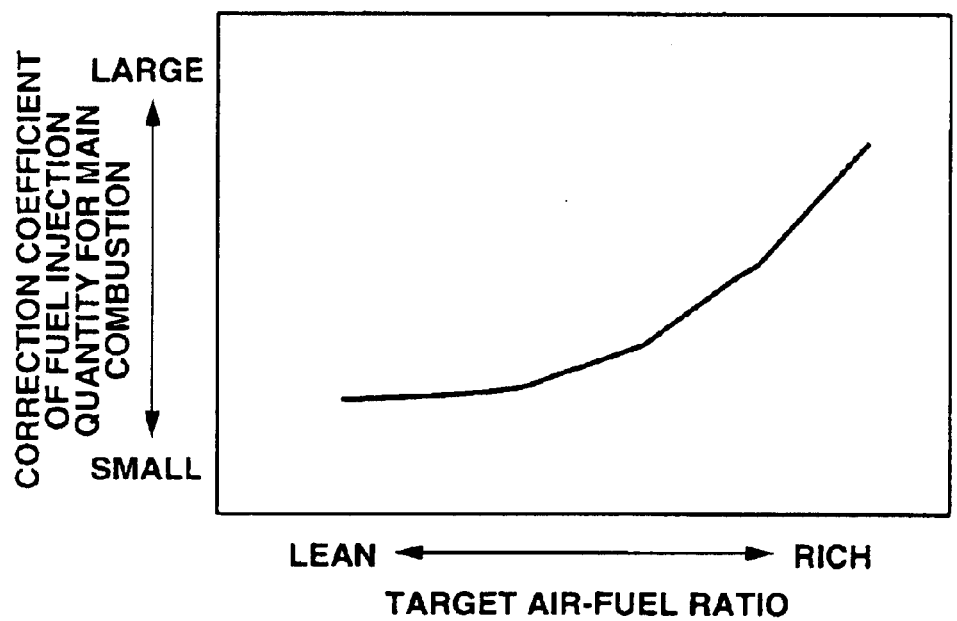
FIG. 23 is a map illustrating a relationship between target air-fuel ratio and correction coefficient of fuel injection quantity for the main combustion in the split retard combustion mode in the apparatus of the embodiment.
Figure 24:
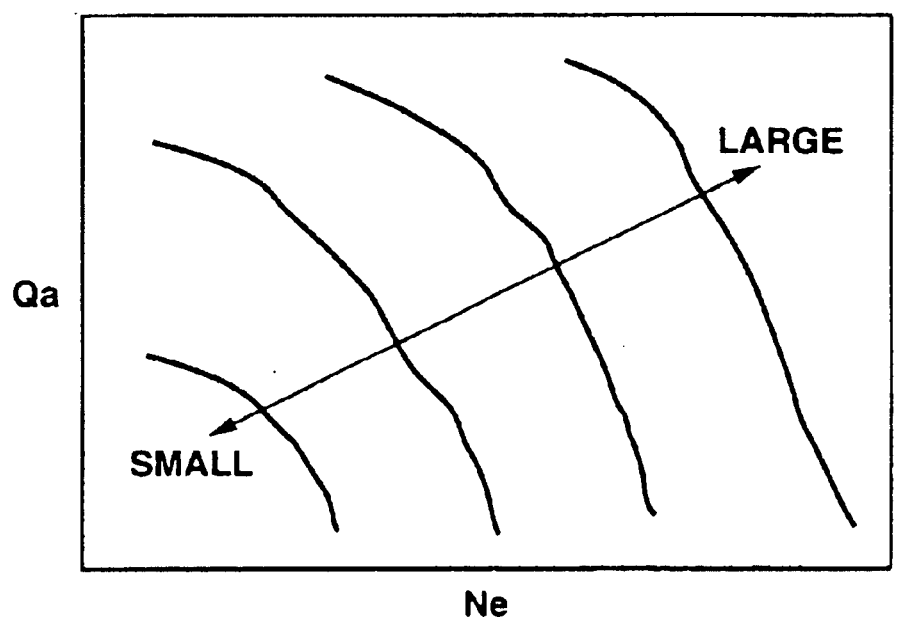
FIG. 24 is a map illustrating a characteristic of a target intake air quantity for the rich spike operation.

Referring back to FIG. 7, at block S102, exhaust air-fuel ratio λ to be provided during the DPF regeneration operation is controlled to a target value, i.e., a rich air-fuel ratio, by searching a map of FIG. 22 based on PM quantity. As illustrated in FIG. 22, as PM quantity becomes larger, the target value of the exhaust air-fuel ratio λ is set richer to thereby prevent abrupt oxidation of a great quantity of PM. The target exhaust air-fuel ratio is attained by adjusting a fresh air quantity by intake throttle valve 6 and/or EGR control valve 19. If the target air-fuel ratio is decreased to the stoichiometric air-fuel ratio or an approximate value thereof, pumping loss will be caused by throttling intake air. Therefore, in such a case, the main fuel injection quantity is corrected to increase using correction coefficient shown in FIG. 23. As illustrated in FIG. 23, as the target air-fuel ratio is varied toward the rich side, the correction coefficient becomes large.

At block S103, a determination is made as to whether or not a bed temperature of DPF 14 is equal to or larger than target lower limit value T22. If the answer to block S103 is YES, the logic goes to block S104. At block S104, a determination is made as to whether or not the DPF bed temperature is equal to or smaller than target upper limit value T21. If the answer to block S104 is YES, the logic goes to block S105. At block S105, a determination is made as to whether or not time t for which the exhaust air-fuel ratio λ is controlled to the target value is larger than reference time tDPFreg1. If the answer to block S105 is YES, it is determined that the DPF regeneration is completed, and the logic goes to block S106.

At block S106, the engine operation is switched from the split retard combustion mode to the normal combustion mode. Heating of DPF 14 is stopped, and the target value of the exhaust air-fuel ratio λ is returned to a normal value. At block S107, reg flag is set to 0. At block S108, rec flag is set to 1 so as to implement the DPF melting prevention operation. By implementing the DPF melting prevention operation, DPF 14 is prevented from melting which will be caused due to abrupt burning of the PM quantity remaining in DPF 14.

If the answer to block S103 is NO, it is determined that the DPF bed temperature is smaller than target lower limit value T22, and the logic goes to block S111. At block S111, the main fuel injection timing is retarded to thereby raise the DPF bed temperature to target lower limit value T22 or more. Then, the logic goes to block S112. At block S112, torque correction is made so as to compensate torque down or torque reduction that is caused due to the retardation of the main fuel injection timing. The torque correction is made by increasing the main fuel injection quantity.

If the answer to block S104 is NO, it is determined that the DPF bed temperature is larger than target upper limit value T21, and the logic goes to block S109. At block S109, the main fuel injection timing is advanced to thereby decrease the exhaust gas temperature and reduce the DPF bed temperature to target upper limit value T21 or less. At block S110, torque correction is made to compensate torque change caused due to the advance of the main fuel injection timing.

If the answer to block S105 is NO, it is determined that time t is equal to or smaller than reference time tDPFreg1, and the logic skips blocks S106–S108 and is ended so as to continue the DPF regeneration operation.

Figure 8:
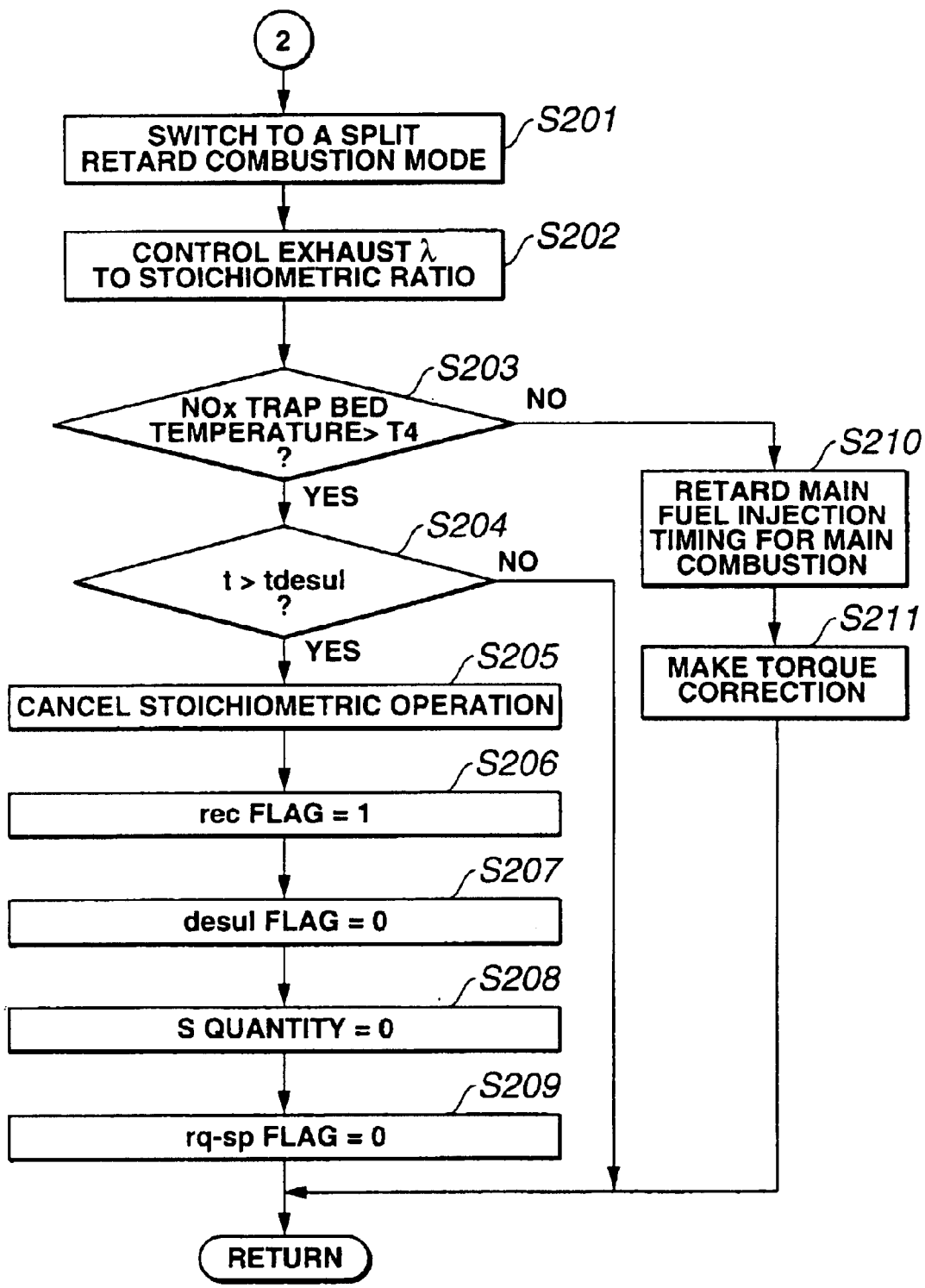
FIG. 8 is a flowchart of a routine executed for implementing recovery of sulfur poisoning of a nitrogen oxide (NOx) trap in the apparatus of the embodiment.

Referring to FIG. 8, subroutine 2 for implementing the recovery of sulfur poisoning of NOx trap 13 executed when the answer to block S7 of the main routine of FIG. 6 is NO, namely, desul flag=1, is explained in detail. At block S201, the engine operation is switched from the normal combustion mode to the split retard combustion mode in accordance with the flow of FIG. 17.

At block S202, the exhaust air-fuel ratio λ is controlled to the stoichiometric air-fuel ratio in order to recover or remove sulfur poisoning of NOx trap 13. The control of the exhaust air-fuel ratio λ is performed by adjusting a fresh air quantity by intake throttle valve 6 and/or EGR control valve 19, similar to the case of implementing the DPF regeneration operation. At block S203, a determination is made as to whether or not a bed temperature of NOx trap 13 is larger than predetermined value T4. For instance, in a case where a Ba-based NOx trap is used, predetermined temperature T4 is set to 600° C. or more because the temperature of NOx trap 13 is required to be not less than 600° C. under rich to stoichiometric atmosphere. If the answer to block S203 is YES, the logic goes to block S204.

At block S204, a determination is made as to whether or not time t for which the recovery of sulfur poisoning of NOx trap 13 is implemented at the stoichiometric air-fuel ratio and at high exhaust gas temperature, is larger than predetermined time tdesul. In other words, a determination is made as to whether or not the sulfur poisoning recovery operation is completed. If the answer to block S204 is YES, it is determined that the sulfur poisoning recovery operation is completed, and the logic goes to block S205.

At block S205, the engine operation at the stoichiometric air-fuel ratio in the split retard combustion mode is cancelled and the engine operation is returned to the normal combustion mode. At block S206, rec flag is set to 1 so as to implement the DPF melting prevention operation. Owing to the implementation of the DPF melting prevention operation, DPF 14 is prevented from melting which is caused due to a burst of burning of the PM quantity accumulated in DPF 14 upon abruptly varying the exhaust air-fuel ratio λ to the lean side.

At block S207, desul flag is set to 0. Next, at block S208, the S quantity accumulated in NOx trap 13 is reset to 0. At block S209, rq-sp flag is set to 0. This is because the NOx quantity trapped by NOx trap 13 is released and reduced by exposing NOx trap 13 to stoichiometric atmosphere having the stoichiometric air-fuel ratio for a long time during the sulfur poisoning recovery operation.

If the answer to block S203 is NO, it is determined that the NOx trap bed temperature is equal to or smaller than predetermined value T4, and the logic goes to block S210. At block S210, the main fuel injection timing is retarded to raise the exhaust gas temperature. At block S211, the torque correction is made so as to compensate the torque reduction caused due to the retardation of the main fuel injection timing. The torque correction is made by increasing the main fuel injection quantity. Blocks S210 and S211 are the same as blocks S111 and S112 of subroutine 1 shown in FIG. 7.

If the answer to block S204 is NO, it is determined that time t is equal to or smaller than predetermined time tdesul, and the logic skips blocks S205–S209 and is ended so as to continue the NOx trap sulfur poisoning recovery operation.

Figure 9:
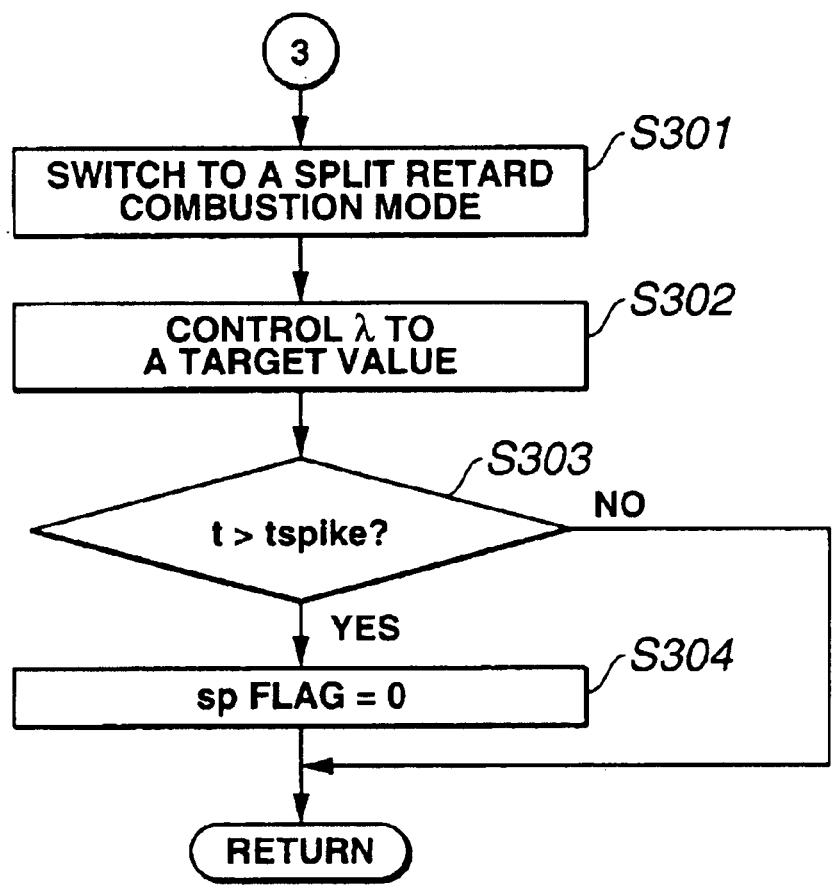
FIG. 9 is a flowchart of a routine executed for implementing a rich spike operation in the apparatus of the embodiment.

Referring to FIG. 9, subroutine 3 for implementing the rich spike operation, namely, the NOx release and reduction operation, is explained in detail. At block S301, the engine operation is switched from the normal combustion mode to the split retard combustion mode in accordance with the flow of FIG. 17. At block S302, the air-fuel ratio $\lambda$ is controlled to a target value, i.e., a rich air-fuel ratio. The target value of the air-fuel ratio $\lambda$ is achieved by controlling an intake air quantity to target intake air quantity Qa shown in FIG. 24. This causes the atmosphere to which NOx trap 13 is exposed, to be temporarily changed to a rich atmosphere, that is, a reducing atmosphere, allowing release and reduction of the NOx quantity trapped by NOx trap 13. At block S303, a determination is made as to whether or not time t for which the rich spike operation is implemented, is longer predetermined time tspike. If the answer to block S303 is YES, it is determined that the rich spike operation is completed, and the logic goes to block S304. At block S304, sp flag is set to 0. If the answer to block S303 is NO, it is determined that time t is equal to or shorter than predetermined time tspike, the logic skips block S304 and is ended so as to continue the rich spike operation.

Figure 10:
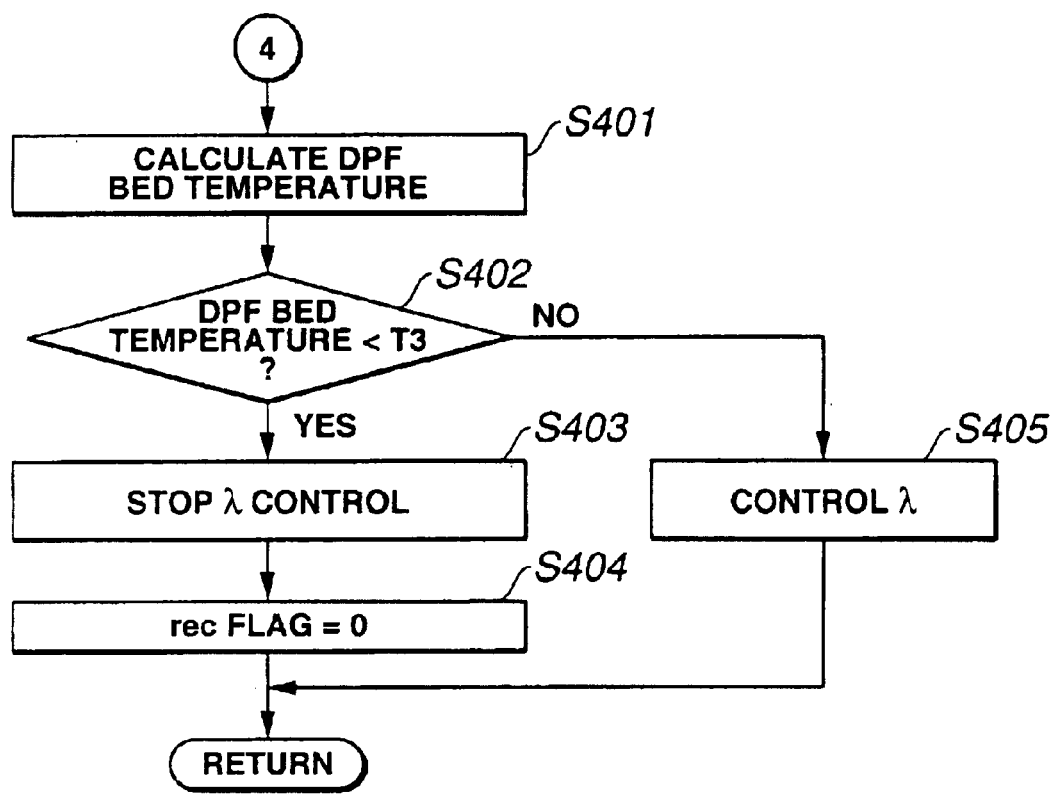
FIG. 10 is a flowchart of a routine executed for preventing melting of the DPF from in the apparatus of the embodiment.

Referring to FIG. 10, subroutine 4 for implementing the DPF melting prevention operation is explained in detail. At block S401, a bed temperature of DPF 14 is calculated. At block S402, a determination is made as to whether or not the DPF bed temperature is smaller than predetermined value T3. In other words, a determination is made as to whether or not the DPF bed temperature is within a temperature range in which occurrence of abrupt oxidation of the PM quantity accumulated in DPF 14 is prevented. If the answer to block S402 is NO, it is determined that the DPF bed temperature is equal to or larger than predetermined value T3, and the logic goes to block S405. At block S405, the air-fuel ratio $\lambda$ is controlled to a preset value by adjusting intake throttle valve 6 and/or EGR control valve 19, in order to decrease the exhaust gas temperature and reduce the DPF bed temperature to a value smaller than predetermined value T3. If the answer to block S402 is YES, it is determined that the DPF melting prevention operation is not required, and the logic goes to block S403. At block S403, the control of the air-fuel ratio $\lambda$ to the preset value is stopped. At block S404, rec flag is set to 0.

Figure 11:
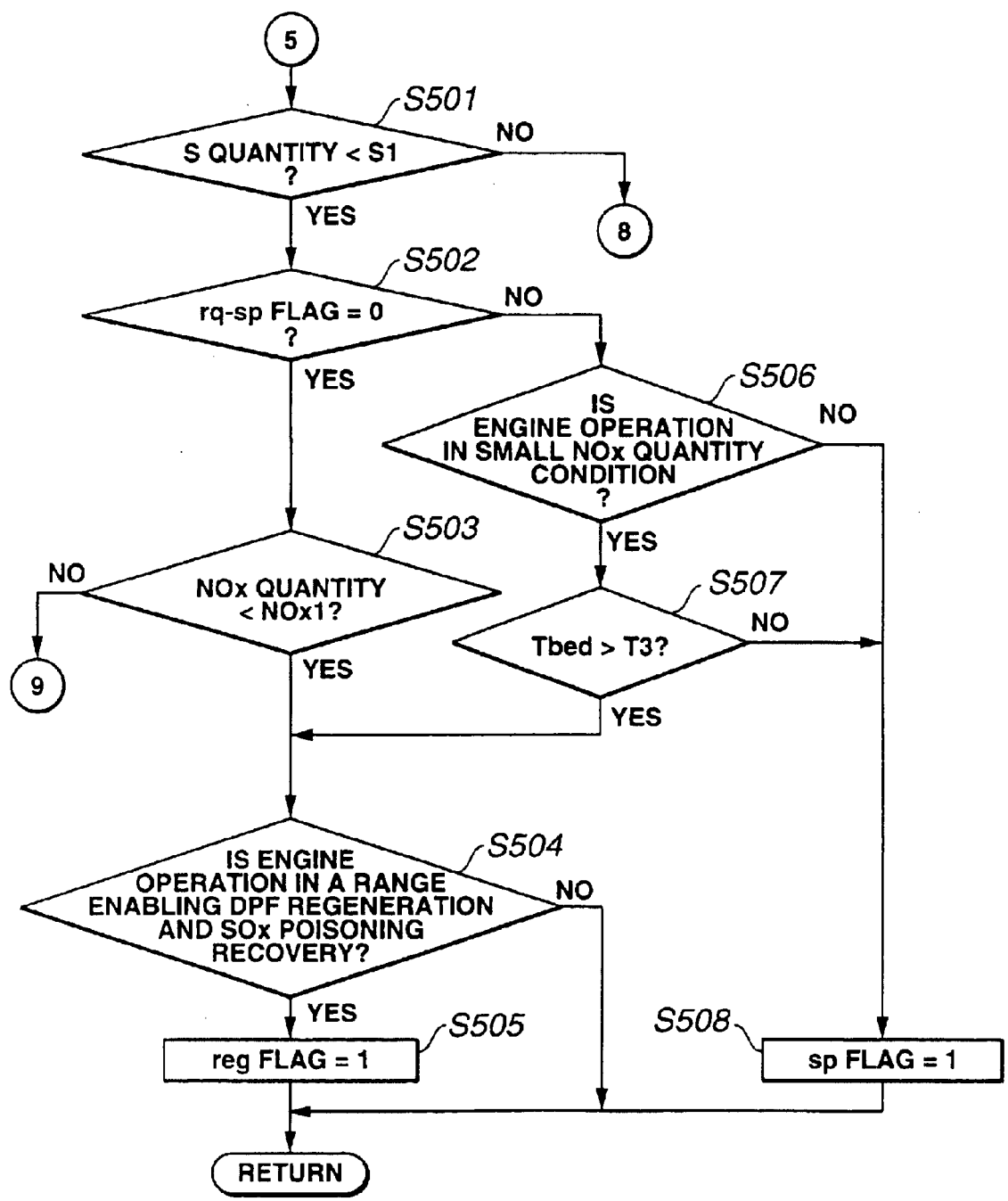
FIG. 11 is a flowchart of a routine executed for determining whether or not the regeneration of the DPF is required under condition that a request to regenerate the DPF is made, in the apparatus of the embodiment.

Referring to FIG. 11, subroutine 5 for giving precedence to the DPF regeneration operation or the NOx trap regeneration operation when the request to regenerate the DPF is made, is explained in detail. At block S501, a determination is made as to whether or not the S quantity accumulated in NOx trap 13 is smaller than preset value S1. If the answer to block S501 is YES, the logic goes to block S502. If the answer to block S501 is NO, it is determined that the S quantity is equal to or larger than preset value S1 and that the NOx trap sulfur poisoning recovery operation is required. Then, the logic goes to subroutine 8 shown in FIG. 14. In FIG. 14, at block S801, rq-desul flag is set to 1 to make the request to implement the NOx trap sulfur poisoning recovery operation.

At block S502, a determination is made as to whether or not rq-sp flag is set to 0. If the answer to block S502 is YES, it is determined that the request to implement the rich spike operation is not made, and the logic goes to block S503. At block S503, a determination is made as to whether or not the NOx quantity trapped by NOx trap 13 is smaller than preset value NOx1. If the answer to block S503 is YES, the logic goes to block S504. If the answer to block S503 is NO, it is determined that the NOx quantity trapped by NOx trap 13 is equal to or larger than preset value NOx1 and that the rich spike operation must be implemented. The logic goes to subroutine 9 shown in FIG. 15. In FIG. 15, at block S901, rq-sp flag is set to 1 to make the request to implement the rich spike operation.

At block S504, a determination is made as to whether or not a current engine operation, i.e., current engine speed Ne and engine load, is in a range enabling the DPF regeneration operation and the NOx trap sulfur poisoning recovery operation in the split retard combustion mode. Namely, the range is an engine operating range in which DPF 14 can be regenerated and sulfur poisoning of NOx trap 13 can be recovered or removed in the split retard combustion mode. If the answer to block S504 is YES, it is determined that the current engine speed Ne and current engine load are in the engine operating range enabling the DPF regeneration operation and the NOx trap sulfur poisoning recovery operation, and the logic goes to block S505. At block S505, reg flag is set to 1 so as to implement the DPF regeneration operation. If the answer to block S504 is NO, the logic skips block S505 and is ended.

If the answer to block S502 is NO, it is determined that the request to implement the rich spike operation is made, and the logic goes to block S506. At block S506, a determination is made as to whether or not a current engine operation is in a condition in which the NOx quantity discharged from the engine is small, namely, a normal engine operating condition. If the answer to block S506 is YES, the logic goes to block S507. At block S507, a determination is made as to whether or not bed temperature Tbed of DPF 14 is larger than predetermined value T3. If the answer to block S507 is YES, the logic goes to block S504.

If the answer to block S506 is NO, the logic goes to block S508. At block S508, sp flag is set to 1 so as to implement the rich spike operation, i.e., the NOx release and reduction operation, preceding the DPF regeneration operation. If the answer to block S507 is NO, it is determined that bed temperature Tbed of DPF 14 is equal to or smaller than predetermined value T3, and the logic goes to block S508. Thus, in a case where bed temperature Tbed of DPF 14 is equal to or smaller than predetermined value T3, the NOx release and reduction operation is implemented preceding the DPF regeneration operation by considering a time required until bed temperature Tbed reaches the temperature at which DPF 14 can be regenerated.

Figure 12:
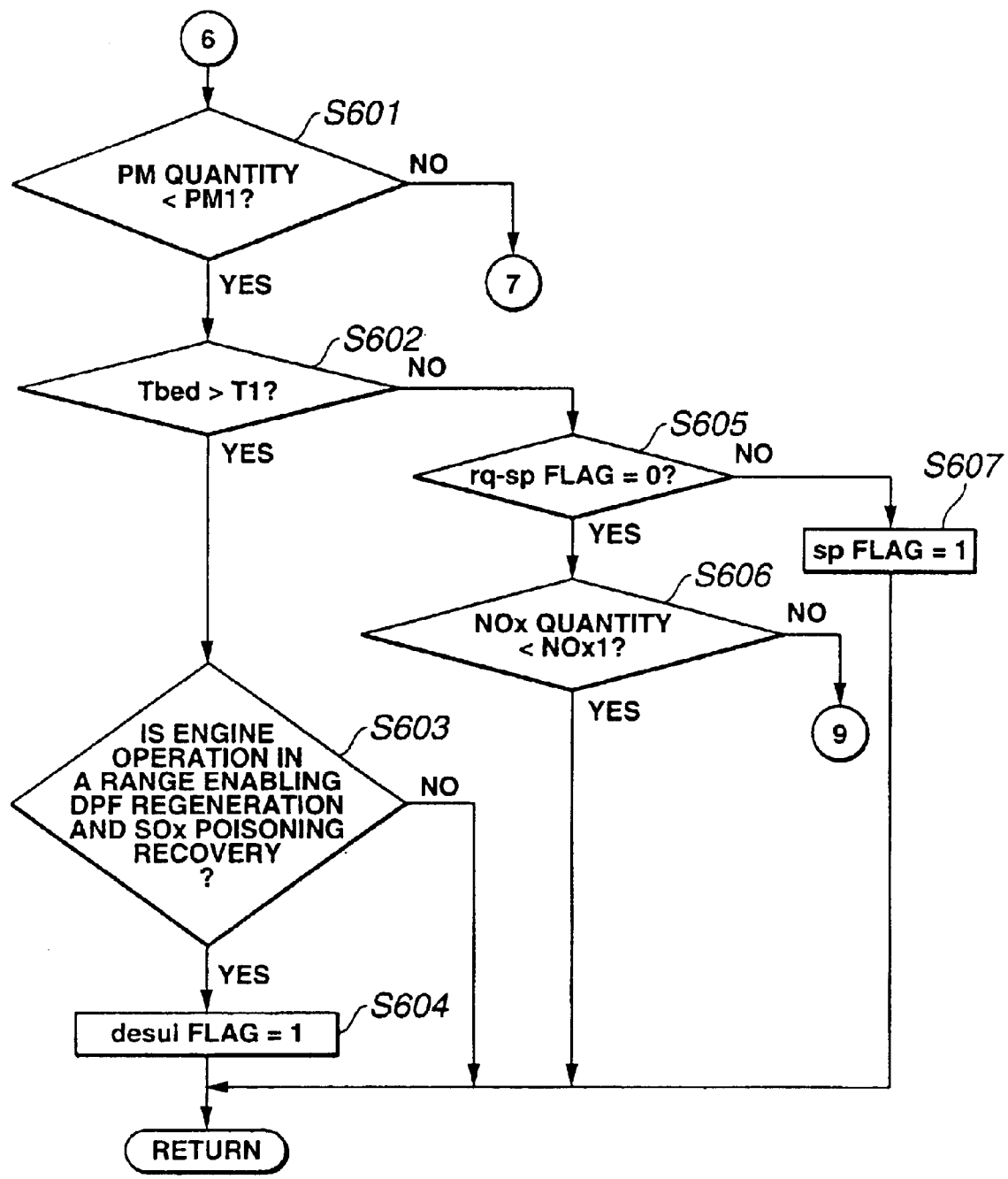
FIG. 12 is a flowchart of a routine executed for determining whether or not the recovery of sulfur poisoning of the NOx trap is required under condition that a request to recover sulfur poisoning of the NOx trap is made, in the apparatus of the embodiment.

Referring to FIG. 12, subroutine 6 for giving precedence to the sulfur poisoning recovery operation or the NOx trap regeneration operation when the request to recover sulfur poisoning of NOx trap 13 is made, is explained in detail. At block S601, a determination is made as to whether or not the PM quantity accumulated in DPF 14 is smaller than preset value PM1. If the answer to block S601 is YES, the logic goes to block S602. If the answer to block S601 is NO, it is determined that the PM quantity is equal to or larger than preset value PM1, and the logic goes to subroutine 7 shown in FIG. 13. In FIG. 13, at block S701, rq-DPF flag is set to 1 to make the request to regenerate DPF 14.

At block S602, a determination is made as to whether or not bed temperature Tbed of NOx trap 13 is larger than predetermined value T1. Predetermined value T1 is a bed temperature of NOx trap 13 which is adequate for implementing the sulfur poisoning recovery operation. If the answer to block S602 is YES, the logic goes to block S603. At block S603, a determination is made as to whether or not a current engine operating condition is in a range enabling the DPF regeneration and the sulfur poisoning recovery. If the answer to block S603 is YES, the logic goes to block S604. At block S604, desul flag is set to 1 so as to implement the sulfur poisoning recovery operation. If the answer to block S603 is NO, the logic skips block S604 and is ended.

If the answer to block S602 is NO, it is determined that bed temperature Tbed of NOx trap 13 is equal to or lower than predetermined value T1, and the logic goes to block S605. At block S605, a determination is made as to whether or not rq-sp flag is set to 0. If the answer to block S605 is YES, it is determined that the request to implement the rich spike operation is not made, and the logic goes to block S606. At block S606, a determination is made as to whether or not the NOx quantity is smaller than preset value NOx1. If the answer to block S606 is YES, it is determined that the NOx release and reduction operation, namely, the rich spike operation, is not required, and the logic is ended.

If the answer to block S605 is NO, it is determined that the request to implement the rich spike operation is made, and the logic goes to block S607. At block S607, sp flag is set to 1 so as to implement the NOx release and reduction operation. If the answer to block S606 is NO, it is determined that the NOx quantity is equal to or larger than preset value NOx1 and that the NOx release and reduction operation, i.e., the rich spike operation, is required. The logic goes to subroutine 9 shown in FIG. 15. In FIG. 15, at block S901, rq-sp flag is set to 1 to make the request to implement the rich spike operation.

Figure 16:
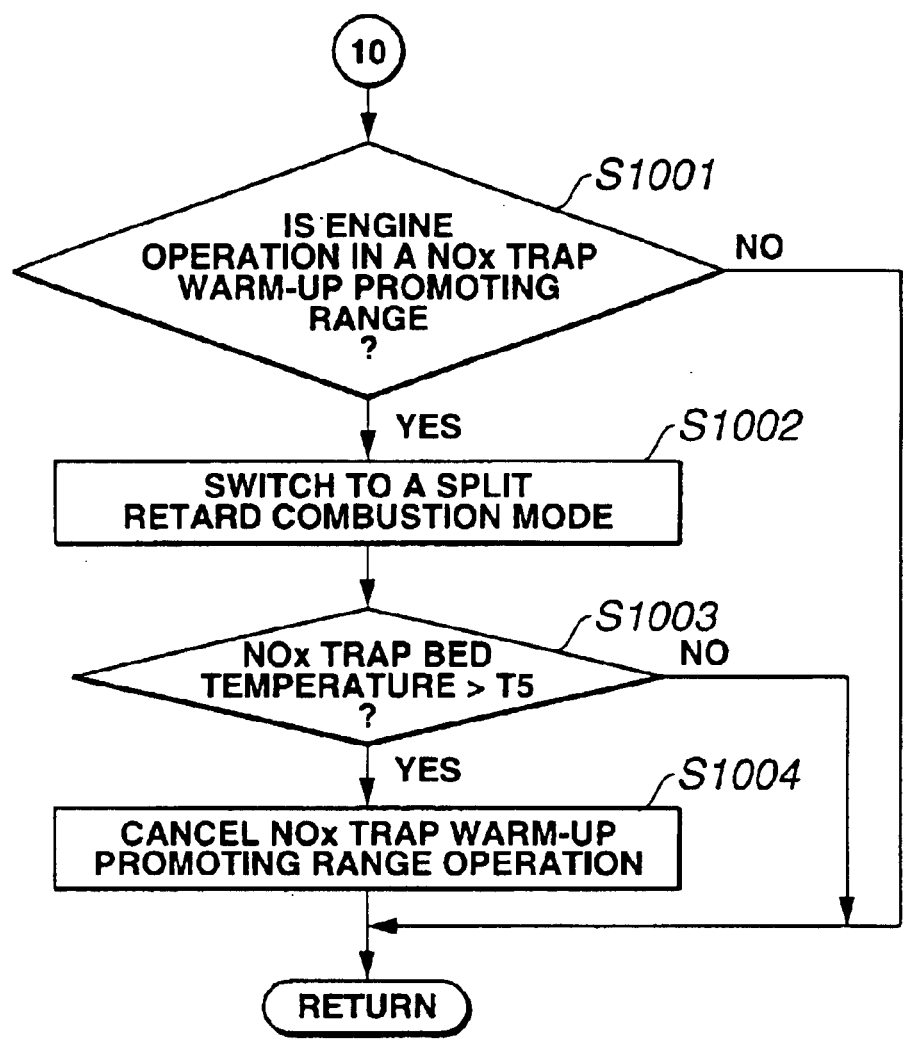
FIG. 16 is a flowchart of a routine executed for controlling promotion of activation of the NOx trap in the apparatus of the embodiment.

Referring to FIG. 16, subroutine 10 for controlling promotion of activation of NOx trap 13 is explained in detail. At block S1001, a determination is made as to whether or not an engine operation is in a NOx trap warm-up promoting range in which warm-up of NOx trap 13 can be promoted. In other words, a determination is made as to whether or not an engine operation is in a condition allowing the split retard combustion mode. If the answer to block S1001 is YES, the logic goes to block S1002. At block S1002, the engine operation is switched from the normal combustion mode to the split retard combustion mode. In the split retard combustion mode, the main combustion period can be effectively retarded to cause increase in the exhaust gas temperature and therefore promote warm-up of NOx trap 13. Next, at block S1003, a determination is made as to whether or not a bed temperature of NOx trap 13 is higher than activation temperature T5 at which NOx trap 13 is activated. If the answer to block S1003 is YES, the logic goes to block S1004. At block S1004, the engine operation in the NOx trap warm-up promoting range is cancelled by switching from the split retard combustion mode to the normal combustion mode.

If the answer to block S1001 is NO, the logic skips blocks S1002-S1004 and is ended. If the answer to block S1003 is NO, the logic skips block S1004 and is ended.

As described above, the combustion control apparatus of the invention provides the split retard combustion mode in which the main combustion is started after the preliminary combustion is completed. This causes the main combustion mainly formed by the premixed combustion to thereby prevent deterioration of smoke emission which is caused upon making an air-fuel ratio rich. Further, an incylinder temperature is increased by the preliminary combustion, so that the main combustion start timing can be retarded, and therefore, the exhaust gas temperature can be increased. Accordingly, when a rich air-fuel ratio operation and a raise of the exhaust gas temperature are required based on a condition of the exhaust gas purifier, the rich air-fuel ratio operation and the raise of the exhaust gas temperature can be realized by switching from the normal combustion mode to the split retard combustion mode, without deteriorating smoke emission.

Further, when an engine operation continues for the predetermined time or longer under condition that the split retard combustion mode can be operated, namely, when an engine operation is stably in a condition that the split retard combustion mode is allowable, switching to the split retard combustion mode is performed. Therefore, the engine operation can be prevented from deviating from the condition before a request to produce the combustion in the split retard combustion mode is fulfilled. This attains the combustion in the split retard combustion mode without deteriorating smoke emission and excessive raise of the exhaust gas temperature.

This application is based on prior Japanese Patent Application No. 2003-282721 filed on Jul. 30, 2003. The entire contents of the Japanese Patent Application No. 2003-282721 are hereby incorporated by reference.

Although the invention has been described above by reference to certain embodiments of the invention, the invention is not limited to the embodiments described above. Modifications and variations of the embodiment described above will occur to those skilled in the art in light of the above teachings. The scope of the invention is defined with reference to the following claims.

What is claimed is:

1. A combustion control apparatus for an internal combustion engine having an exhaust passage, the combustion control apparatus comprising:
   an exhaust gas purifier adapted to be disposed in the exhaust passage of the engine; and
   a control unit programmed to:
      selectively implement a first combustion mode and a second combustion mode, the second combustion mode providing main combustion to produce main torque and preliminary combustion at or near top dead center of a compression stroke prior to the main combustion, and starting the main combustion after the preliminary combustion is completed;
      determine whether or not a request to switch from the first combustion mode to the second combustion mode is made based on a condition of the exhaust gas purifier; and
      switch from the first combustion mode to the second combustion mode when the request to switch from the first combustion mode to the second combustion mode is made and the engine continues to operate for a predetermined time or longer under condition enabling the second combustion mode.

2. The combustion control apparatus as claimed in claim 1, wherein the control unit is further programmed to determine whether or not the request to switch from the first combustion mode to the second combustion mode is made, based on a quantity of matter accumulated in the exhaust gas purifier.

3. The combustion control apparatus as claimed in claim 2, wherein the exhaust gas purifier comprises a NOx trap constructed to trap NOx contained in the exhaust gas when an exhaust gas air/fuel ratio is lean, the control unit being further programmed to determine whether or not the request to switch from the first combustion mode to the second combustion mode is made based on a quantity of sulfur content accumulated in the NOx trap, the control unit being further programmed to recover sulfur poisoning of the NOx trap by controlling the exhaust gas air/fuel ratio to a stoichiometric air/fuel ratio and raising an exhaust gas temperature in the second combustion mode.

4. The combustion control apparatus as claimed in claim 2, wherein the exhaust gas purifier comprises a diesel particulate filter constructed to collect particulate matter contained in the exhaust gas, the control unit being further programmed to determine whether or not the request to switch from the first combustion mode to the second combustion mode is made based on a quantity of the particulate matter collected by the diesel particulate filter, the control unit being further programmed to regenerate the diesel particulate filter by controlling the exhaust gas air/fuel ratio to a target value lower than a stoichiometric air/fuel ratio and raising an exhaust gas temperature in the second combustion mode.

5. The combustion control apparatus as claimed in claim 2, wherein the exhaust gas purifier comprises a NOx trap constructed to trap NOx contained in the exhaust gas when an exhaust gas air/fuel ratio is lean, the control unit being further programmed to determine whether or not the request to switch from the first combustion mode to the second combustion mode is made based on a quantity of the NOx trapped by the NOx trap, the control unit being further programmed to regenerate the NOx trap by controlling the exhaust gas air/fuel ratio to a target value lower than a stoichiometric air/fuel ratio and raising an exhaust gas temperature in the second combustion mode.

6. The combustion control apparatus as claimed in claim 1, wherein the condition enabling the second combustion mode is an engine operating condition in which engine speed is equal to or lower than a predetermined speed and engine load is a medium load between an upper limit and a lower limit.

7. The combustion control apparatus as claimed in claim 1, wherein the control unit is further programmed to control a fuel injection quantity to be provided for the preliminary combustion to a fuel injection quantity required to increase an incylinder temperature higher than a self ignition temperature at which an air-fuel mixture is spontaneously ignitable, when a fuel injection for the main combustion is provided.

8. The combustion control apparatus as claimed in claim 1, wherein the control unit is further programmed to retard a main combustion start timing of the main combustion from a preliminary combustion start timing of the preliminary combustion by not less than 20° in terms of crank angle.

9. The combustion control apparatus as claimed in claim 1, wherein the control unit is further programmed to set a main combustion end timing of the main combustion to equal to or greater than 50° in terms of crank angle after compression top dead center.

10. The combustion control apparatus as claimed in claim 1, wherein the control unit is further programmed to control an exhaust gas temperature by varying a fuel injection timing to be provided for the main combustion.

11. The combustion control apparatus as claimed in claim 3, wherein the control unit is further programmed to recover sulfur poisoning of the NOx trap when the engine continues to operate for the predetermined time or longer under the condition enabling the second combustion mode and the quantity of sulfur content reaches a preset value (S2) even when the quantity of sulfur content is below a level (S1) for requesting to recover sulfur poisoning of the NOx trap.

12. The combustion control apparatus as claimed in claim 1, wherein the control unit is further programmed to produce the preliminary combustion a plurality of times at one cycle of the engine operation in the second combustion mode, the preliminary combustion being produced at or near compression TDC at least once.

13. A method for controlling combustion in an internal combustion engine having an exhaust passage, an exhaust gas purifier being disposed in the exhaust passage, the method comprising:

detecting an operating condition of the engine;

detecting a condition of the exhaust gas purifier;

selectively implementing a first combustion mode and a second combustion mode, the second combustion mode which provides main combustion to produce main torque and preliminary combustion at or near top dead center of a compression stroke prior to the main combustion, and starts the main combustion after the preliminary combustion is completed;

determining whether or not a request to switch from a first combustion mode to a second combustion mode is made based on the condition of the exhaust gas purifier;

determining whether or not the engine continues to operate for a predetermined time or longer under condition enabling the second combustion mode, based on the operating condition of the engine; and switching from the first combustion mode to the second combustion mode when the request to switch from the first combustion mode to the second combustion mode is made and the engine continues to operate for the predetermined time or longer under condition enabling the second combustion mode.

14. The method as claimed in claim 13, wherein the exhaust gas purifier comprises a NOx trap constructed to trap NOx contained in the exhaust gas when an exhaust gas air/fuel ratio is lean, the condition of the exhaust gas purifier being detected by a quantity of sulfur content accumulated in the NOx trap, further comprising controlling the exhaust gas air/fuel ratio to a stoichiometric air/fuel ratio and raising an exhaust gas temperature in the second combustion mode to thereby recover sulfur poisoning of the NOx trap.

15. The method as claimed in claim 13, wherein the exhaust gas purifier comprises a diesel particulate filter constructed to collect particulate matter contained in the exhaust gas, the condition of the exhaust gas purifier being detected by a quantity of the particulate matter collected by the diesel particulate filter, further comprising controlling the exhaust gas air/fuel ratio to a target value lower than a stoichiometric air/fuel ratio and raising an exhaust gas temperature in the second combustion mode to thereby regenerate the diesel particulate filter.

16. The method as claimed in claim 13, wherein the exhaust gas purifier comprises a NOx trap constructed to trap NOx contained in the exhaust gas when an exhaust gas air/fuel ratio is lean, the condition of the exhaust gas purifier being detected by a quantity of the NOx trapped by the NOx trap, further comprising controlling the exhaust gas air/fuel ratio to a target value lower than a stoichiometric air/fuel ratio and raising an exhaust gas temperature in the second combustion mode to thereby regenerate the NOx trap.

17. The method as claimed in claim 13, wherein the condition enabling the second combustion mode is an engine operating condition in which engine speed is equal to or lower than a predetermined speed and engine load is a medium load between an upper limit and a lower limit.

18. The method as claimed in claim 13, further comprising controlling a fuel injection quantity to be provided for the preliminary combustion to a fuel injection quantity required to increase an incylinder temperature higher than a self ignition temperature at which an air-fuel mixture is spontaneously ignitable, when a fuel injection for the main combustion is provided.

19. The method as claimed in claim 13, further comprising retarding a main combustion start timing of the main combustion from a preliminary combustion start timing of the preliminary combustion by not less than 20° in terms of crank angle.

20. The method as claimed in claim 13, further comprising setting a main combustion end timing of the main combustion to equal to or greater than 50° in terms of crank angle after compression top dead center.

21. The method as claimed in claim 13, further comprising controlling an exhaust gas temperature by varying a fuel injection timing to be provided for the main combustion.

22. The method as claimed in claim 14, wherein the controlling the exhaust gas air/fuel ratio is implemented when the engine continues to operate for the predetermined time or longer under the condition enabling the second combustion mode and the quantity of sulfur content reaches a preset value even when the quantity of sulfur content is below a level for requesting to recover sulfur poisoning of the NOx trap.

23. The method as claimed in claim 13, further comprising producing the preliminary combustion a plurality of times at one cycle of the engine operation in the second combustion mode, the preliminary combustion being produced at or near compression TDC at least once.

* * * * *